United States Patent [19]

Miyatake et al.

[11] Patent Number: 5,657,160
[45] Date of Patent: Aug. 12, 1997

[54] POLARIZATION PLANE ROTATOR APPLICABLE TO POLARIZATION CONVERTER AND PROJECTION DISPLAY SYSTEM

[75] Inventors: Yoshito Miyatake; Shinya Sannohe, both of Osaka, Japan

[73] Assignee: Matsushita Electric Industrial Co., Ltd., Osaka, Japan

[21] Appl. No.: 160,751

[22] Filed: Dec. 3, 1993

[30] Foreign Application Priority Data

Dec. 3, 1992 [JP] Japan .................................. 4-323907
Jan. 13, 1993 [JP] Japan .................................. 5-003776

[51] Int. Cl.$^6$ .......................... G02B 5/30; G02B 27/28
[52] U.S. Cl. .......................... 359/487; 359/488; 359/583; 359/589; 359/834
[58] Field of Search .................................. 359/487, 488, 359/494, 495, 496, 498, 583, 584, 589, 831, 834, 835, 836

[56] References Cited

U.S. PATENT DOCUMENTS

| | | | |
|---|---|---|---|
| 2,087,329 | 7/1937 | Ott | 359/835 |
| 2,887,566 | 5/1959 | Marks | 359/487 |
| 3,402,364 | 9/1968 | Lang | 359/487 |
| 3,879,105 | 4/1975 | Broche et al. | 359/831 |
| 4,367,949 | 1/1983 | Lavering | 359/835 |
| 4,380,076 | 4/1983 | Bethune | 359/831 |
| 4,509,830 | 4/1985 | Kato et al. | 359/583 |
| 4,525,034 | 6/1985 | Simmons . | |
| 4,806,750 | 2/1989 | Vincent | 359/589 |
| 4,822,150 | 4/1989 | Duarte . | |
| 4,948,228 | 8/1990 | Keens . | |
| 4,979,026 | 12/1990 | Lang et al. . | |
| 4,991,938 | 2/1991 | Buhrer et al. . | |
| 5,061,050 | 10/1991 | Ogura | 359/589 |
| 5,132,822 | 7/1992 | Buhrer . | |
| 5,223,956 | 6/1993 | Krammer et al. . | |
| 5,237,446 | 8/1993 | Takahashi | 359/583 |

FOREIGN PATENT DOCUMENTS

| | | |
|---|---|---|
| 0421628 | 4/1991 | European Pat. Off. . |
| 0422661 | 4/1991 | European Pat. Off. . |
| 62-133424 | 6/1987 | Japan . |
| 63-168622 | 7/1988 | Japan . |
| 63-197913 | 8/1988 | Japan . |
| 63-271313 | 11/1988 | Japan . |
| 2-64522 | 3/1990 | Japan . |
| 3-94213 | 4/1991 | Japan . |
| 3-126910 | 5/1991 | Japan . |

OTHER PUBLICATIONS

"Principles of Optics", Max Born et al., pp. 46–50, 1959.

Primary Examiner—Ricky D. Shafer
Attorney, Agent, or Firm—Lowe, Price, LeBlanc & Becker

[57] ABSTRACT

A polarization plane rotator, for executing rotation of the plane of polarization of linearly polarized light that is incident thereon with a predetermined angle of incidence, is formed of a transparent prism or an array of such prisms, each prism having a triangular cross-sectional shape, with first, second and third surfaces having respective lines of intersection that are mutually parallel. The linearly polarized light is incident on the first surface, to be reflected twice in succession at the second and third surfaces, to be emitted from the first surface with the plane of polarization rotated by 90° and the direction of propagation altered. An optical thin film is formed on the second and third surfaces, for substantially reducing an amount of phase difference between the P and S polarization components which results from reflection, thereby ensuring that the emitted light is substantially completely linearly polarized. The polarization plane rotator can be combined with a polarizing beam splitter to form a polarization converter to implement a polarized light source having very high efficiency, suitable for use in a projection display system employing a polarization-dependent light valve.

12 Claims, 19 Drawing Sheets

POLARIZATION PLANE ROTATOR APPLICABLE TO POLARIZATION CONVERTER AND PROJECTION DISPLAY SYSTEM

BACKGROUND OF THE INVENTION

Field of the Invention

The present invention relates to a polarization plane rotator for rotating the plane of polarization of linearly polarized light by an angle of substantially 90°, to a polarization converter which incorporates such a polarization plane rotator and converts incident natural (i.e. unpolarized) light to substantially entirely linearly polarized light, to a polarized light source which incorporates such a polarization converter and emits light which is substantially entirely linearly polarized, and to a projection display system which incorporates such a polarized light source.

Description of the Prior Art

With generally used types of projection display system which are responsive to a video signal for projecting a corresponding large-size display image onto a screen, the video signal is used to control a device functioning as a "light valve", to modulate the intensity of the projected light before the light is passed through a projection lens. In recent years, liquid crystal panels have come into use as light valves in such a projection display system. In general, TN (twisted nematic) liquid crystal material is used in such types of application. For example such a projection display system is described by T. Ono et al. in Japanese Patent Laid-open Publication No. SHO 62-133424. In that apparatus, three liquid crystal panels are utilized to control the projected light, each panel having an array of liquid crystal cell elements (corresponding to respective picture elements) utilizing TN liquid crystal. Transmission of light through the liquid crystal cell elements is controlled by respective TFTs (thin-film transistors) functioning as individual switching elements. With a TN liquid crystal panel in the prior art, it has been necessary to provide respective polarizing plates on the incidence side and emission side of the liquid crystal panel. The incidence side polarizing plates serve to convert incident natural light (emitted from a suitably bright source of light) into linearly polarized light. However only approximately half the total incident natural light will be transmitted as linearly polarized light by such a polarizing plate, so that the overall light conversion efficiency of the projection display system is low. This is a significant problem of a prior art projection display system which utilizes a liquid crystal type of light valve.

To overcome that problem, various proposals have been made for polarization converters which will efficiently convert natural light to linearly polarized light, by utilizing substantially all of the natural light. That can be done by first converting a beam of natural light into two beams of linearly polarized light, which have their respective planes of polarization oriented mutually perpendicular. Various devices for executing such conversion are known, i.e. polarizing beam splitters. If one of these two beams of linearly polarized light is then passed through a device (referred to hereinafter as a polarization plane rotator) which rotates the plane of polarization by 90°, and the direction of propagation of the resultant polarized light beam is made identical to that of the other beam of polarized light, then substantially all of the original natural light can be utilized as linearly polarized light. In the prior art, it has been general practice to utilize a half-wave plate as a polarization plane rotator.

A prior art example of such a polarization converter is described by Y. Nagashima in Japanese Patent Laid-open Publication No. SHO 63-168622, in which a polarizing beam splitter is disposed immediately following a light source, to separate the natural light emitted from the light source into two beams of linearly polarized light, having the respective planes of polarization mutually displaced by 90°. The plane of polarization of one of these polarized light beams is then rotated by 90° by passage through a TN liquid crystal panel, which functions as a polarization plane rotator, and the direction of propagation of that light is made identical to that of the other (non-rotated) light. The combined linearly polarized light thus obtained is then incident on an image-forming liquid crystal panel.

In the case of Japanese Patent Laid-open Publication No. SHO 63-271313 by K. Nishi a basically similar polarization converter is described, however instead of using a TN liquid crystal panel to execute rotation of the plane of polarization, a conventional (i.e. solid) half-wave plate is used. In a polarization converter described by W. Imai in Japanese Patent Laid-open Publication No. SHO 63-197913, the converter is configured from a polarizing beam-splitter and two plane mirrors.

A device which provides the function of a half wave plate is described in U.S. Pat. No. 4,948,228, by Keens. The device consists of two prisms, separated by a small gap, arranged such that incident polarized light undergoes multiple reflections within one prism, is transmitted to the other prism, and again undergoes multiple reflections before emerging. One reflecting surface of each of the prisms has a multi-layer optical thin film formed thereon, and it is stated that a phase shift of 180° is produced between the S and P polarization components as a result of transmission through the device. Such a device, formed of two complicated prisms which must be held accurately spaced apart, would be relatively expensive to manufacture.

Another type of device, which is different from a half-wave plate but could be used to produce a phase difference of half-wave between the P and S polarization components of light transmitted through the device, is Fresnel's rhomb (M. Born et al., "Principles of Optics", Pergammon Press, p. 50, 1959). If a Fresnel's rhomb is formed of glass, then it will have excellent heat resisting capabilities, while in addition the phase difference exhibits only a small dependency upon wavelength. However that device has the disadvantage that the dimension of the device along the direction of the incident light axis is rather long, while in addition it is rather expensive to manufacture.

If a TN liquid crystal panel is used as a polarizing plane rotator, it has the disadvantage of a low degree of heat withstanding capability. In the case of a device of the type in which two plane mirrors are used to produce rotation of the plane of polarization of light by 90°, the optical path difference between the two beams of light which are obtained will be so long that it is difficult to combine these in a satisfactory manner. Hence, irregularity of brightness will occur in the projected image, if such a device is used in a polarization converter for polarizing the projection light.

N. Ohishi in Japanese Patent Laid-open Publication No. HEI 3-126910 describes a method of reducing the weight of a polarizing beam splitter by utilizing a multi-layer film having polarization separation properties, which is sandwiched between two transparent plates, with arrayed minute prisms being formed on external faces of these plates.

There are two or three possible positions for a polarization converter within the optical system of a projection display system which utilizes a TN liquid crystal panel or TN liquid crystal panels to modulate the projected light. The polarization converter can be positioned immediately following the light source (i.e. projection lamp), immediately before the liquid crystal panel, or at intermediate positions within a color separating optical system (using a plurality of polarization converters) in the case of a projection display system in which the light is separated into three primary color light beams, which are modulated by respective liquid crystal panels. If the polarization converter is positioned immediately before the liquid crystal panel, then the two types of light which are emitted from the polarization converter (i.e. the polarization component which has not been rotated, and the polarization component which has been rotated by 90°) may not be smoothly combined when they fall on the liquid crystal panel. In that case it is possible that variations in brightness will appear in the projected image. For that reason, in a practical apparatus, there are only two possible positions for the polarization converter, i.e. immediately following the light source or at intermediate positions within the color separating optical system, as described above.

The position immediately following the light source has the disadvantage that the polarization converter is subjected to high temperatures, so that it is necessary for the polarization converter to be capable of withstanding high temperature operating conditions.

Optical crystal having a birefringence optical characteristic, or extruded transparent resin film can be utilized to form a half-wave plate for use in implementing a polarization converter. Optical crystal has the advantage of excellent resistant to heat, but is expensive. Extruded transparent resin film is inexpensive, but presents problems with regard to its capability for withstanding heat. However in addition, both optical crystal and extruded transparent resin film each have the disadvantage that the phase difference between the P and S polarization components of light which is transmitted through a half-wave plate formed from such a material exhibits a substantial degree of variation in accordance with the wavelength of the light. As a result, if such half-wave plates are utilized in a polarization converter in a projection display system, color irregularities may occur in the projected image.

It can thus be understood that there is a requirement for a polarization converter, to efficiently convert natural light to linearly polarized light, which will be suitable for application to a projection display system that employ light modulation by means of a TN liquid crystal panel or a plurality of liquid crystal panels in combination. To be suitable for such an application, the polarization converter should be inexpensive to manufacture, capable of being formed in a compact size, be capable of operation in a high-temperature environment, should emit linearly polarized light in which a first polarization component (which has been directly extracted from natural light from a light source) and a second polarization component (which has been extracted and then rotated in plane of polarization by 90°) are closely combined with identical directions of propagation, and should exhibit only a small amount of dependency of phase difference between the P and S components upon wavelength.

SUMMARY OF THE INVENTION

It is an objective of the present invention to overcome the various problems of the prior art set out above. Specifically, it is a first objective of the invention to provide an improved polarization plane rotator for rotating the plane of polarization of linearly polarized light by an angle substantially equal to 90° and for reflecting the linearly polarized light, the polarization plane rotator being of compact size and exhibiting only a small degree of dependency of phase shift between the P and S polarization components of the emitted light upon the wavelength of the light.

It is a second objective of the invention to provide an improved polarization converter for converting natural light to linearly polarized light, incorporating the improved polarization plane rotator, the polarization converter being capable of being made resistant to heat, of being made compact in size, and inexpensive to manufacture.

It is a third objective of the invention to provide an improved polarized light source for emitting linearly polarized light, incorporating the improved polarization converter, the polarized light source being of compact size.

It is a fourth objective of the invention to provide an improved projection display system incorporating the improved polarized light source, having a high level of brightness of a projected display image, uniformity of the projected display image brightness, and freedom from color irregularities in the projected display image.

To achieve the above objectives, according to a first aspect, the present invention provides a polarization plane rotator comprising a transparent prism having a cross-sectional shape in the form of an isosceles triangle, having a first plane surface, a second plane surface, a third plane surface, an optical thin film formed on each of the second plane surface and the third plane surface, an incident light axis along which an incident light ray propagates, and an emitted light axis along which propagates an emitted light ray corresponding to the incident light ray; wherein the optical thin film has a refractive index that is lower than a refractive index of the prism, wherein each of the incident light axis and emitted light axis is oriented substantially parallel to a reference plane of the rotator and obliquely intersects the first plane surface, the reference plane being defined as a plane which includes a line of intersection of the second and third plane surfaces and intersects the prism symmetrically, wherein the rotator is disposed within an external medium, and wherein: the incident light ray which has an entry plane of polarization and propagates along the incident light axis is refracted at the first plane surface to fall on either of the second plane surface and the third plane surface to be reflected thereby; a light ray refracted at the first plane surface and reflected at the second plane surface is reflected at the third plane surface, and a light ray refracted at the first plane surface and reflected at the third plane surface is reflected at the second plane surface; and light rays which have been successively reflected at both the second and third plane surfaces are then refracted at the first plane surface, to exit from the prism along the emitted light axis with a plane of polarization of exit light rays rotated relative to the plane of polarization of the incident light ray.

With such a polarization plane rotator, the second and third plane surfaces may be mutually identical in size and shape, with an angle of intersection between the second and third plane surfaces being a right angle. Preferably, total reflection of light occurs at the second and third plane surfaces.

In addition, an optical thin film is preferably formed on each of the second and third plane surfaces, with the optical thin film having a refractive index that is lower than a refractive index of the transparent prism.

The optical thin film is preferably a multi-layer optical thin film having at least two layers, with the optical thin film being configured such that, designating the refractive index of the transparent prism as $n_o$, successive layers of the multi-layer optical thin film extending sequentially from the transparent prism as a first layer to a k-th layer respectively, a refractive index of a j-th one of the layers as $n_j$ and a thickness of the j-th layer as $d_j$, an angle of refraction in the j-th layer as $\gamma_j$, and a predetermined wavelength of light in air as $\lambda_c$, the following conditions are satisfied:

$$\sqrt{n_0} = \begin{cases} \dfrac{n_1 n_3 \ldots n_k}{n_2 n_4 \ldots n_{k-1}} & (k: \text{odd}) \\ \dfrac{n_1 n_3 \ldots n_{k-1}}{n_2 n_4 \ldots n_k} & (k: \text{even}) \end{cases}$$

$$d_j = \frac{\lambda_c}{4 n_j \cos\gamma_j}$$

The refractive index of the k-th layer is preferably lower than that of the transparent prism, and a suitable material for the k-th layer is magnesium fluoride.

To achieve a reduced dependency upon wavelength, for a phase change between P and S polarization components of light which occurs as a result of reflections at the second and third plane surfaces, an additional layer may be formed between any two of the layers of the multi-layer optical thin film. Designating the additional film layer as having a refractive index $n_j'$, a thickness $d_j'$ and angle of refraction of $\gamma_j'$, the following condition must be satisfied:

$$d_j' = \frac{\lambda_c}{2 n_j' \cos\gamma_j'}$$

According to a second aspect, the present invention provides a polarization plane rotator comprising a transparent plate having a flat surface and having an opposite surface to the flat surface formed with a plurality of elongated minute prisms arrayed at regular spacings, each of the minute prisms having a first and a second prism surface, the first and second prism surfaces being inclined at an identical angle of inclination to the flat surface.

With such a polarization plane rotator, two prism surfaces of each of the minute prisms preferably intersect at an angle of 90°, and total reflection occurs at these prism surfaces.

Such a polarization plane rotator preferably further comprises an optical thin film formed on the prism surfaces, the optical thin film having a refractive index which is lower than a refractive index of the transparent plate.

According to a third aspect, the present invention provides a polarization converter having a polarization selective mirror for separating a beam of natural light into a first polarized light beam which is substantially close to a condition of linear polarization in a first polarization direction and a second polarization light beam which is substantially close to a condition of linear polarization in a second polarization direction which is rotated by 90° from the first polarization direction, the first and second polarization light beams having respectively different directions of propagation, and having a polarization plane rotator positioned for the first polarization light beam to be incident thereon;

wherein the polarization plane rotator comprises a transparent plate having a flat surface and having an opposite surface to the flat surface formed with a plurality of elongated minute prisms arrayed at regular spacings, each of the minute prisms having two prism surfaces which are inclined at an identical angle of inclination to the flat surface;

the polarization plane rotator converting the first polarization light beam to an emitted polarization light beam which is substantially linearly polarized with a direction of polarization that is rotated by 90° from the polarization direction of the first polarization light beam, the polarization plane rotator being positioned in relation to the polarization selective mirror such that the emitted polarization light beam and the second polarization light beam are substantially mutually parallel.

With such a polarization selective mirror, a right angle is formed between an axis of incidence and an axis of reflective emission.

The polarization selective mirror preferably comprises a multi-layer optical thin film which transmits a major portion of a P polarization component of light that is incident thereon and reflects a major portion of an S polarization component of the incident light, and two transparent triangular prisms having the multi-layer optical thin film sandwiched therebetween. The transparent triangular prisms may each be formed of a transparent silicone resin.

Alternatively, the polarization selective mirror can comprise a multi-layer optical thin film which transmits a major portion of a P polarization component of light that is incident thereon and reflects a major portion of an S polarization component of the incident light, and two transparent plates each having a flat surface and having an opposite surface to the flat surface formed with a plurality of elongated minute prisms arrayed at regular spacings, the multi-layer optical thin film being sandwiched between the flat surfaces of the transparent plates. The two transparent plates can be mutually attached by a transparent silicone resin.

According to a fourth aspect, the present invention provides a polarization converter having two polarization selective mirrors which are disposed for separating a beam of natural light into two beams of substantially linearly polarized light, and two polarization plane rotators, wherein each of the polarization plane rotators comprises a transparent plate having a flat surface and having an opposite surface to the flat surface formed with a plurality of elongated minute prisms arrayed at regular spacings, each of the minute prisms having two prism surfaces which are inclined at an identical angle of inclination to the flat surface, the two polarization selective mirrors having reflective surfaces thereof disposed in a V-configuration, the polarization plane rotators being disposed respectively parallel to the reflective surfaces of the polarization selective mirror, the polarization selective mirrors being oriented with respect to the beam of natural light such that a first polarization component of the natural light is transmitted through the polarization selective mirrors and a second polarization component of the natural light is reflected by the polarization selective mirrors as first and second beams of polarized light which are incident on respective ones of the polarization plane rotators, whereby each of the first and second beams of polarized light has a plane of polarization thereof rotated by 90° and a direction of propagation thereof altered to become substantially parallel to a direction of propagation of the first polarization component.

The polarization selective mirror of such a polarization converter may comprise a multi-layer optical thin film which transmits a major portion of a P polarization component of light that is incident thereon and reflects a major portion of an S polarization component of the incident light, and two transparent plates each having a flat surface and having an opposite surface to the flat surface formed with a plurality of elongated minute prisms arrayed at regular spacings, the multi-layer optical thin film being sandwiched between the flat surfaces of the transparent plates.

According to a fifth aspect, the present invention provides a polarized light source having a light source which emits a beam of natural light, a polarization selective mirror for separating the beam of natural light into a first polarized light beam which is substantially linearly polarized and a second polarized light beam which is substantially linearly polarized with an axis of polarization differing by 90° from an axis of polarization of the first polarized light beam, and a polarization plane rotator;

wherein the polarization plane rotator comprises a transparent plate having a flat surface and having an opposite surface to the flat surface formed with a plurality of elongated minute prisms arrayed at regular spacings, each of the minute prisms having two prism surfaces which are inclined at an identical angle of inclination to the flat surface, and wherein the polarization plane rotator is oriented in relation to the polarization selective mirror such that the first polarized light beam is incident on the polarization selective mirror, thereby rotating the plane of polarization of the first polarized light beam by 90°, and such that a direction of propagation of the first polarized light beam is altered to become substantially parallel to a direction of propagation of the second polarized light beam.

However such a polarized light source can be advantageously configured using two such polarization selective mirrors, disposed to reflect non-transmitted polarization components of a incident natural light beam to respectively opposite sides, and two such polarization plane rotators, for respectively acting on the sideward-reflected polarization components.

According to a sixth aspect, the present invention provides a projection display system comprising:

a light source which emits a beam of natural light;

a polarization selective mirror disposed for separating a beam of natural light into two beams of substantially linearly polarized light having respective directions of polarization differing by 90° and respectively different directions of direction of propagation, and a polarization plane rotator which is oriented in relation to the polarization selective mirror such that the first polarized light beam is incident on the polarization selective mirror, thereby rotating the plane of polarization of the first polarized light beam by 90°, and such that a direction of propagation of the first polarized light beam is altered to become substantially parallel to a direction of propagation of the second polarized light beam;

a light valve having incident thereon light which is emitted from the polarization selective mirror and the polarization plane rotator and executing changes in polarization rotation or birefringence in accordance with a video signal to produce an optical image; and a projection lens having incident thereon light which is emitted from the light valve, for projecting the optical image onto a projection screen.

wherein the polarization plane rotator comprises a transparent plate having a flat surface and having an opposite surface to the flat surface formed with a plurality of elongated minute prisms arrayed at regular spacings, each of the minute prisms having two prism surfaces which are inclined at an identical angle of inclination to the flat surface.

According to a seventh aspect, the present invention provides a projection display system comprising:

a light source which emits a beam of natural light containing three primary colors as color components;

color separating means for separating the beam of natural light into three primary color light beams;

three light valves disposed to have the three primary color light beams respectively incident thereon, each of the light valves being responsive to a video signal for executing changes in polarization rotation or birefringence to thereby form an optical image;

color combining means for combining emitted light beams from the light valves into a single light beam;

a projection lens having incident thereon light which is emitted from the light valve, for projecting the optical images formed by the light valves, onto a projection screen; and polarization converter means disposed at an incidence side of the color separating means or at intermediate positions within the color separating means, for converting the natural light into light which is substantially linearly polarized;

wherein the polarization converter means comprises a polarization selective mirror for separating a natural light beam that is incident thereon into a first polarized light beam which is substantially linearly polarized and a second polarized light beam which is substantially linearly polarized with a direction of polarization that differs by 90° from a direction of polarization of the first polarized light beam, and a polarization plane rotator having the first polarized light beam incident thereon, for rotating the direction of polarization of the first polarized light beam by 90° and altering a direction of propagation of the first polarized light beam to become substantially parallel to a direction of propagation of the second polarized light beam, and wherein the polarization plane rotator comprises a transparent plate having a flat surface and having an opposite surface to the flat surface formed with a plurality of elongated minute prisms arrayed at regular spacings, each of the minute prisms having two prism surfaces which are inclined at an identical angle of inclination to the flat surface.

DESCRIPTION OF PREFERRED EMBODIMENTS

Figure 1:
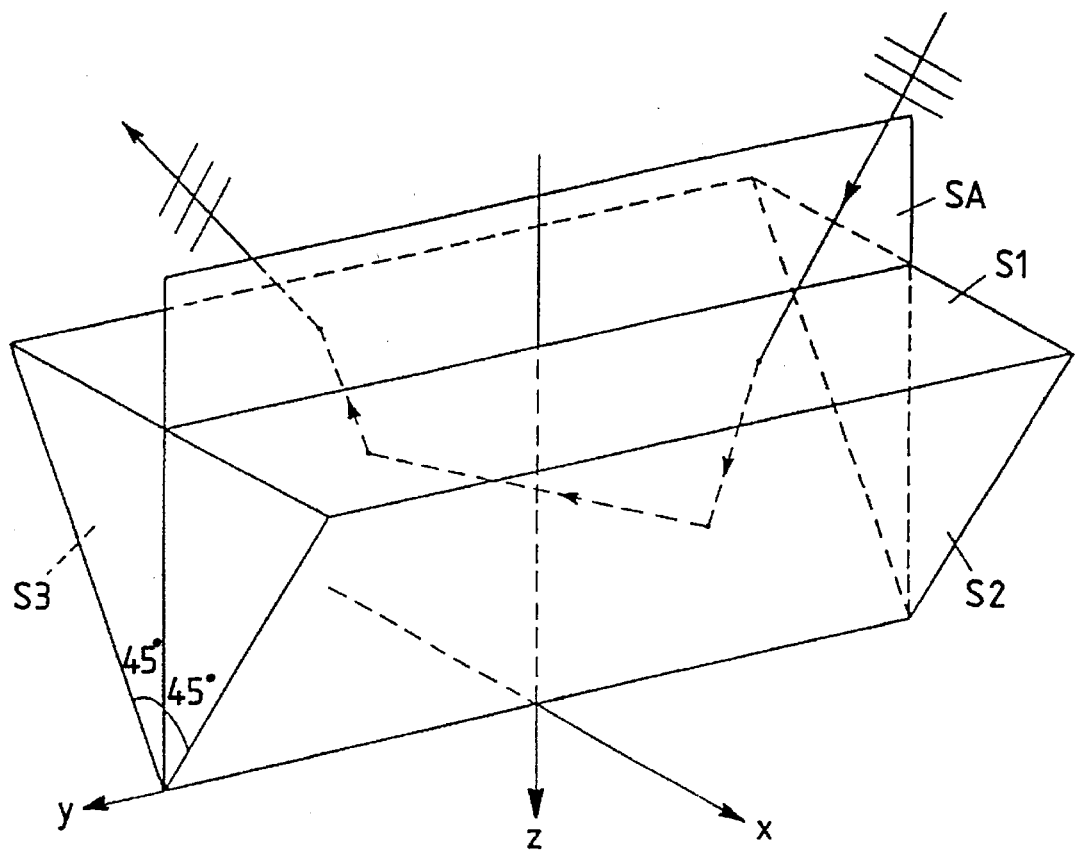
FIG. 1 is an oblique line view of a model of an optical prism, for illustrating the basic principles of a polarization plane rotator according to the present invention.
Figure 2A:
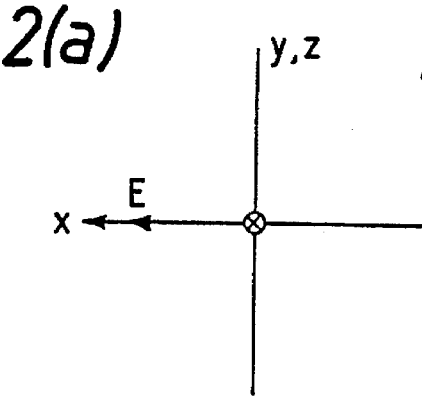
FIGS. 2(a)–2(h) shows respective polarization rotation diagrams, for use in describing the operation of a polarization plane rotator according to the present invention.
Figure 2B:
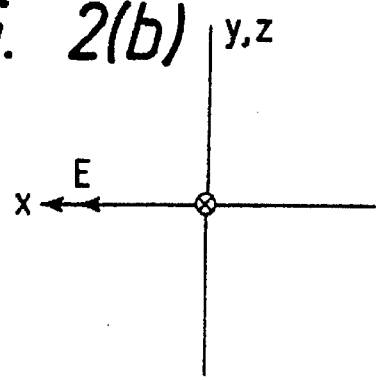
Figure 2C:
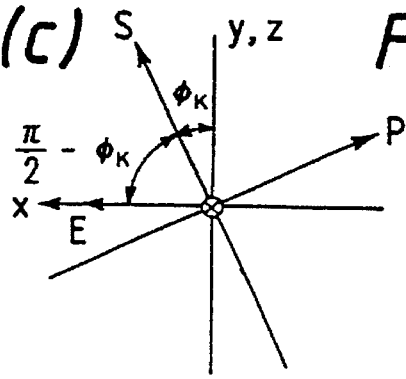
Figure 2D:
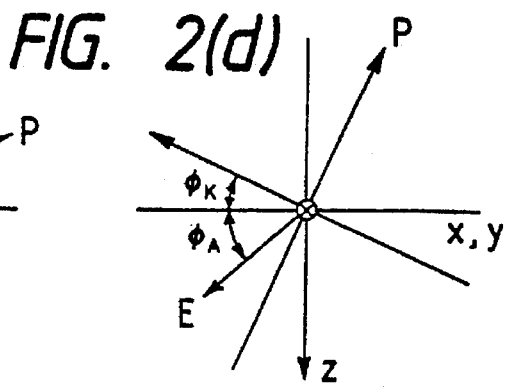
Figure 2E:
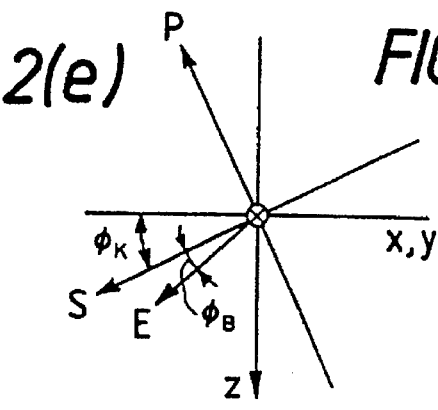
Figure 2F:
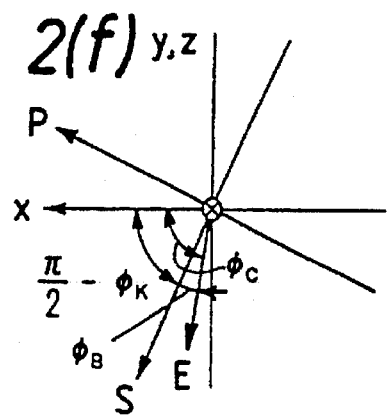
Figure 2G:
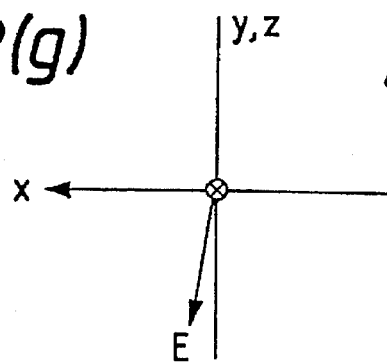
Figure 2H:
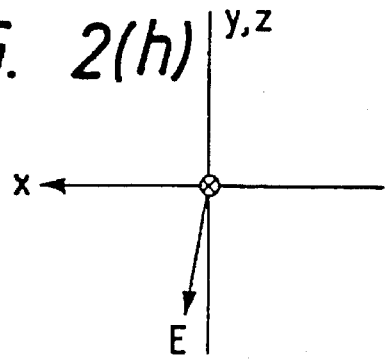

Before describing embodiments of the present invention, the basic principles of a polarization plane rotator according to the present invention will be described, referring to FIG. 1, which is an oblique view of a model of such a rotator. In FIG. 1, numeral 10 denotes a transparent prism having three lateral surfaces, which have respective lines of intersection that are mutually parallel, having a cross-sectional shape formed with a right angle and with the remaining two angles mutually equal. Such a body is generally referred to as a right-angle prism. The refractive index of the prism 10 will be designated as $n_o$, and the external medium will be assumed to be air (having a refractive index of 1). A plane surface of the prism which connects the apexes of the aforementioned two mutually equal angles will be designated as the first surface S1. The remaining two lateral surfaces of the prism will be designated as the second surface S2 and third surface S3 respectively. A 3-dimensional coordinate system x,y,z is defined such that the y-axis is aligned along the line of intersection of the second surface S2 and third surface S3, the z-axis is a line which passes through the y-axis and is perpendicular to the first surface S1, and the x-axis is perpendicular to both the y-and z-axes. The y,z plane will be designated as the reference plane SA.

A light ray which is incident on the first surface S1 will be diffracted at that surface, to then fall on the second surface S2 or on the third surface S3, and is thereby reflected from these surfaces in the sequence S2-S3, or S3-S2, to be then refracted at the first surface S1 and emitted from that surface. If as in this case the angle formed between the second surface S2 and third surface S3 is a right angle, then a light ray which is emitted from the first surface S1 after having been reflected in the sequence S2-S3, and a light ray which is emitted after having been reflected in the sequence S3-S2, will be mutually parallel.

The case will be considered in which linearly polarized light, whose direction of propagation is parallel to the reference plane SA and whose plane of polarization is perpendicular to the reference plane SA, is incident on the first surface S1, to be thereby refracted to fall on the second surface S2 and third surface S3 successively, and then be emitted to the exterior. It will be assumed that the transmittance of the first surface S1 is 100%, and the reflectances of the second surface S2 and third surface S3 are each 100%. It will also be assumed that for each of the surfaces S2, S3, linearly polarized light that is incident on the surface results in reflected light which is also linearly polarized. That condition is achieved if the relative phase difference for such reflection at a prism surface is 0° or an integral multiple of 180°, i.e. the difference between (phase change between the P polarization components of the incident and reflected light respectively) and (phase change between the S polarization components of the incident and reflected light respectively), is zero or a multiple of 180°. With the present invention, that relative phase difference is made close to 0°. For brevity, such a condition will be stated hereinafter as "the phase difference for the prism surface is zero".

In the example of FIG. 1, since the state of polarization of the linearly polarized light that falls on the first surface S1 is not changed as a result of refraction or reflection at any of the surfaces, resultant linearly polarized light will be emitted from the first surface S1.

FIG. 2 illustrates the respective polarization conditions of linearly polarized light which is incident on the first surface S1 of the prism of FIG. 1, with the plane of polarization being perpendicular to the reference plane SA. In FIG. 2, moving from top to bottom, the polarization conditions for the first surface S1, the second surface S2, the third surface S3 and the first surface S1 are successively shown in the pairs of diagrams (a), (b), diagrams (c), (d), diagrams (e), (f) and diagrams (g), (h) respectively. In each case, the left-hand diagram shows the orientation (within the aforementioned x, y z coordinate system) of the plane of polarization of light immediately prior to being reflected or refracted at a surface of the prism, while the corresponding right-hand diagram shows the orientation of the plane of polarization of the light immediately after being reflected or refracted at that surface. The direction of the light ray is designated by ⊗, to indicate that the light ray is incident perpendicularly to the plane of the paper, directed from the front side to the rear side of the paper. The orientation of the plane of polarization can be expressed as the vector sum of two polarization components, i.e. the aforementioned S and P components, which are respectively parallel to two mutually perpendicular axes, i.e. S and P polarization directions. These axes are defined with respect to a specific plane and to the direction of propagation of a light ray which is incident on or is reflected or refracted at that plane. Specifically, the S polarization direction is perpendicular to the plane of incidence of the light ray, and perpendicular to the direction of propagation of the light. The P polarization direction is parallel to the plane of incidence, and perpendicular to the direction of propagation. Thus, the S, P axes of a light ray will differ in accordance with the plane which is being considered.

Diagram (a) of FIG. 2 shows the polarization condition of linearly polarized light that is incident on the first surface S1, with a direction of polarization that is parallel to the reference plane SA of FIG. 1 (i.e. the y, z plane) and having a plane of polarization E that is parallel to the x-axis and perpendicular to the y, z plane. With respect to the plane of the first surface S1 of the prism, the incident light has only an S polarization component, with no P polarization component. When the light is refracted at the surface S1, the resultant diffracted light rays will also contain only the S polarization component (with respect to the plane of S1) and the plane of polarization E is still parallel to the x-axis, as shown in diagram (b).

The polarization condition of these light rays with respect to the plane of the second surface S2, prior to incidence on that surface, is shown in diagram (c) of FIG. 2. As shown, the direction of the S polarization component of the light rays is now angularly displaced from the y, z plane by the angle $\phi_k$. $\phi_k$ will be referred to as the polarization plane rotation angle, and is expressed as follows:

$$\phi_k = \tan^{-1}\frac{\sin\theta_1}{n_0} \quad (1)$$

In the above, $\theta_1$ is the angle of incidence of the light rays on the first surface S1. The direction of the plane of polarization E of these light rays (prior to being incident on the second surface S2) is now displaced by an angle of $(\pi/2-\phi_k)$, moving in the counter-clockwise direction, from the direction of the S axis, as shown in diagram (c). The plane of polarization E is of course still parallel to the x-axis and perpendicular to the y and z axes.

Next, as shown in diagram (d) of FIG. 2, the S polarization component of the light rays which have been reflected from the second surface S2 is displaced by the angle $\phi_k$ in the counter-clockwise direction from the x, y plane. Since the respective amplitudes of the S and P polarization components are not affected by that reflection, but the respective orientations of the S and P polarization directions have changed, the plane of polarization of light rays reflected from the second surface S2 will be rotated from the S axis by the angle $(\pi/2-\phi_k)$, in the clockwise direction. Hence, the plane of polarization E has been rotated from the x, y plane by the angle $\phi_A$, in the counter-clockwise direction, as a result of reflection from the surface S2. That angle is obtained as follows:

$$\phi_A = \frac{\pi}{2} - 2\phi_k \quad (2)$$

As shown in diagram (e), the direction of the S polarization component of the light rays which are incident on the third surface S3 is rotated from the x, y plane in the counter-clockwise direction by the angle $\phi_k$. The plane of polarization E of these light rays is therefore rotated from the x, y plane in the counter-clockwise, by the angle $\phi_A$. Hence, the orientation of the plane of polarization E is angularly displaced by rotation in the counter-clockwise direction, from the S axis, through the angle $\phi_B$, where that angle is defined as:

$$\phi_B = \phi_A - \phi_k = \frac{\pi}{2} - 3\phi_k \quad (3)$$

As shown in diagram (f) of FIG. 2, the direction of the S polarization component of light rays which have been reflected from the third surface S3 is rotated by the angle $(\pi/2-\phi_k)$ in the counter-clockwise direction from the +x direction. Since the respective magnitudes of the S and P polarization components are unchanged by that reflection, the plane of polarization E of the light rays reflected from the third surface S3 is rotated by the angle $\phi_B$, in the counter-clockwise direction, from the S axis. Hence, the plane of polarization E of the light rays which have been reflected from the third surface S3 is obtained by rotation through the angle $\phi_C$ in the counter-clockwise direction, from the +x direction. That angle is defined as:

$$\phi_C = \frac{\pi}{2} - \phi_k + \phi_B = \pi - 4\phi_k \quad (4)$$

The respective directions of the planes of polarization of light rays which are incident on the first surface S1 after reflection from the third surface S3, and the corresponding light rays which are emitted from the first surface S1 to the exterior, are shown in diagrams (g), (h) respectively of FIG. 2. From equation (4), if $\phi_k$ equals $\pi/8$, then it can be understood that $\phi_c$ will be equal to $\pi/2$. That is to say, the polarization plane E of light rays reflected from the third surface S3 will be parallel to the y, z plane, i.e. the reference plane SA, so that the polarization plane E of light rays which are emitted through the first surface S1 to the exterior will also be parallel to the reference plane SA.

It can thus be understood that the emitted light from the first surface S1 will be linearly polarized and will have a plane of polarization that is parallel to the reference plane SA if all of the following conditions are satisfied:

(a) there are no losses at any of the surfaces of the prism;

(b) the phase difference (as defined hereinabove) for reflection from each of the surfaces S1, S2 is zero;

(c) $\phi_k$ equals $\pi/8$; and (d) linearly polarized light having a plane of polarization that is perpendicular to the reference plane SA is incident on the first surface S1.

When linearly polarized light having a plane of polarization that is perpendicular to the reference plane SA is incident on the first surface S1, the linear polarization component of the resultant light which is emitted from the first surface S1 (that polarization component being parallel to the reference plane SA) will be referred to as the valid emitted component. The ratio of the intensity of the valid emitted component to the intensity of the aforementioned incident light expresses a measure of the overall efficiency of the polarization plane rotator, and that ratio (expressed as a percentage) will be designated as the overall efficiency $\eta$. The value of that overall efficiency can be computed based upon the transmittance of the first surface S1, and the values of phase difference (as defined hereinabove) for the second surface S2 and third surface S3. Since the computation is extremely complex, only the results of the computation will be given. Assuming that the second and third surfaces S2, S3 have the same value of phase difference, and each have a reflectance of 100%, then the overall efficiency $\eta$ can be obtained from the following:

$$\eta = T_S T_P \eta_E \eta_R \quad (5)$$

$$\eta_E = \cos^4 \frac{\delta}{2} \quad (6)$$

$$\eta_R = \sin^2 4\phi_k \quad (7)$$

In the above, $T_S$ is the transmittance of the S polarization component at the first surface S1, $T_P$ is the transmittance for the P polarization component at the first surface S1, $\eta_E$ is a phase difference merit factor, $\eta_R$ is a polarization plane rotation merit factor, $\delta$ is the phase difference for reflection at the second surface S2 and third surface S3, as defined hereinabove.

From the above equations (5), (6) and (7) it can be understood that in order to maximize the overall efficiency factor $\eta$, the transmittance values $T_S$, $T_P$ at the first surface S1 should each be equal to 1, the phase difference $\delta$ at the second surface S2 and at the third surface S3 should be 0°, and the polarization rotation angle $\phi_k$ should be 22.5°.

From considerations of combining such a polarization plane rotator with other parts of an optical system, in general it is preferable that there be an angle of 90° between the respective directions of propagation of the incident light and the resultant emitted light from the polarization plane rotator. If values of 45° for $\phi_1$ and 22.5° for $\phi_k$ are inserted into equation (1), then $n_o$ becomes equal to 1.71. Hence, if the prism is formed of a material having a value of refractive index which is close to 1.71, then the above condition is achieved, whereby the respective directions of propagation of the incident light and the resultant emitted light differ by 90°. Even if the value of $\phi_k$ differs slightly from 22.5°, $\sin^2 4\phi_k$ will be close to 1. Hence, it becomes possible to utilize an inexpensive material such as white crown glass (having a refractive index of 1.52) as the material forming the prism.

The relationship between the angle of incidence $\theta_2$ and the polarization plane rotation angle $\phi_k$ at the second surface S2 is expressed by the following equation:

$$\sin\theta_2 = \frac{1}{\sqrt{2}\,\cos\phi_k} \quad (8)$$

If a value of 22.5° for $\phi_k$ is inserted into equation (8), then $\theta_2$ becomes equal to 49.9°. If the external medium is air, and the prism is formed of a material having a value of refractive index of 1.5, then the critical angle of incidence for total reflection will be 41.8°. Thus, total reflection is achieved at the second and third surfaces S2, S3.

The phase difference values resulting from reflections at the second surface S2 and third surface S3 will now be considered. The relative phase difference $\delta$ (as defined hereinabove) at total reflection is expressed by the following equation (M. Born et al., "Principles of Optics", Pergammon Press, pp. 46–50, 1959):

$$\tan\frac{\delta}{2} = \frac{\cos\theta_2 \sqrt{n_0^2 \sin^2\theta_2 - 1}}{n_0 \sin^2\theta_2} \quad (9)$$

From equation (9), when $\theta_2$ equal 49.9°, the phase difference $\delta$ takes the value 44.9° if $n_o$ equals 1.5, and takes the value 56.6° if $n_o$ equals 1.7. The corresponding values of the phase difference merit factor $\eta_E$, obtained from equation (16) above, are 73.0% and 60.2% respectively. These values are rather low. For that reason, with a polarization plane rotator according to the present invention, a multi-layer optical thin film formed of at least one optical layer is preferably formed on each of the second surface S2 and third surface S3, to thereby make the value of phase difference for reflection from each of these surfaces sufficiently small.

Figure 3:
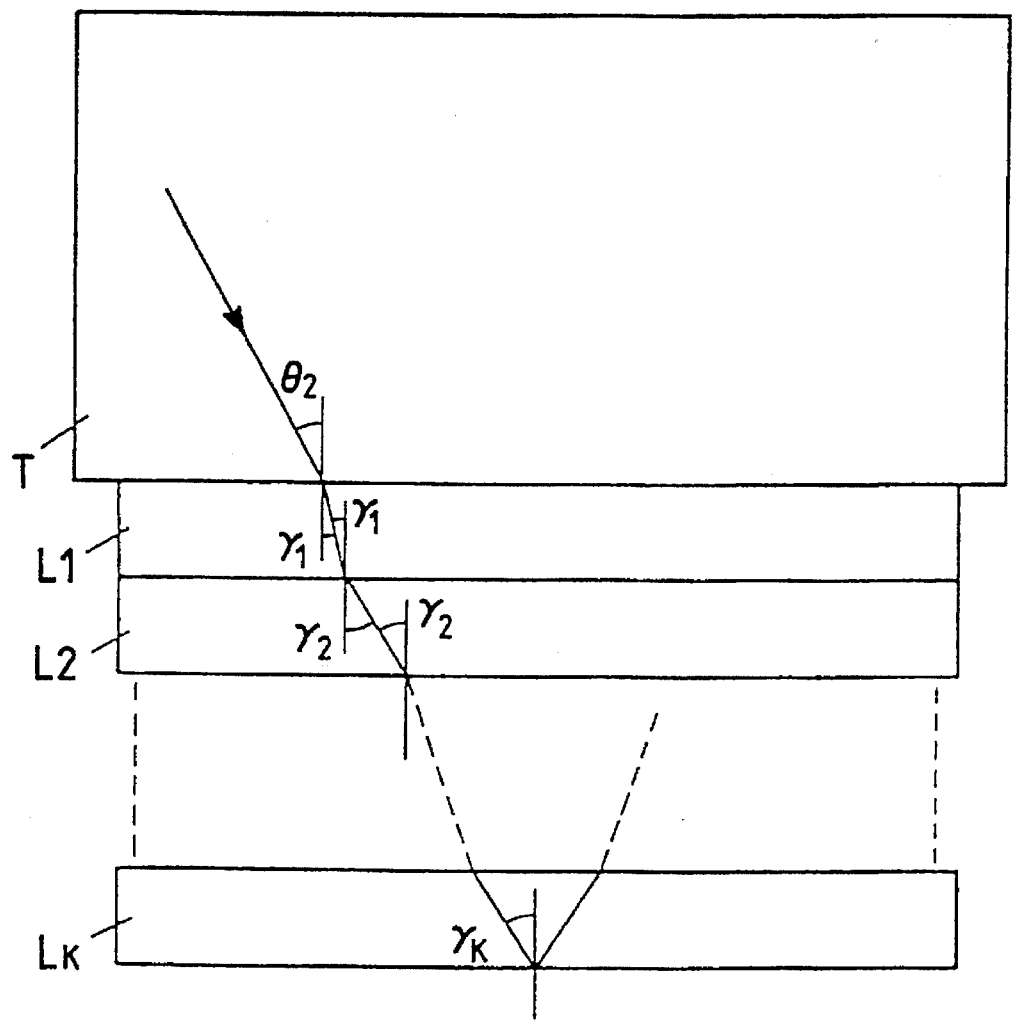
FIG. 3 is a diagram for illustrating the configuration and operation of a multi-layer optical thin film which is utilized in a polarization plane rotator according to the present invention.

The principles of this will be described referring to FIG. 3. Here, k layers (where k is an integer) of optical thin film are successively formed on a transparent body T. Moving successively outward from the transparent prism T, the layers are respectively designated as the first layer L1, second layer L2, . . . k-th layer Lk. In general, the surface of the j-th layer Lj which is facing the transparent prism T will be designated as the j-th surface, and the boundary surface (i.e. final surface) between the k-th layer Lk and the external air will be designated as the (k+1)-th surface. Designating the refractive index of the transparent prism T as $n_0$, the refractive index of the j-th layer as $n_j$, the refractive index of the external medium layer as $n_{k+1}(=1)$, the angle of incidence of light rays which fall on the second surface from the transparent prism T as $\theta_2$, and the angle of refraction of light rays which are refracted at the j-th surface towards the (j+1)-th surface as $\gamma_j$, then from Snell's law of refraction, the following relationship exists:

$$n_0 \sin\theta_2 = n_j \sin\gamma_j (j=1,2,\ldots k) \quad (10)$$

If it is assumed that there are some light rays which are incident on the multi-layer optical thin film after being emitted from the prism, and which do not undergo total reflection at any of the layers L1 to Lk, then from equation (10), if there are light rays which would undergo total reflection at the surface of the transparent prism T if the multi-layer optical thin film were not formed on that surface, these light rays will undergo total reflection at the (k+1)-th surface, which is the boundary surface with the external air.

The overall reflectance, from the j-th surface to the final surface, is obtained by replacing the set of reflectances of that set of surfaces by that of a single equivalent surface, which will be referred to as the j-th equivalent surface. Based on that concept, the following cumulative equations can be established for use in iterative calculations. Firstly, the reflectance of the final surface is obtained, then the reflectance for the k-th equivalent surface, and so on successively, using iterative calculations to sequentially obtain values of reflectance for each of the equivalent surfaces, up to the first equivalent surface. The value of reflectance thus obtained for the first equivalent surface is the reflectance for the entire multi-layer optical thin film.

The phase change which occurs in the S polarization component at total reflection from the final surface will be designated as $\epsilon_{k+1,s}$, and the corresponding phase change of the P polarization component as $\epsilon_{k+1,p}$. These are respectively expressed as follows:

$$\tan\frac{\epsilon_{k+1,s}}{2} = \frac{\sqrt{n_k^2 \sin^2\gamma_k - 1}}{n_k \cos\gamma_k} \quad (11)$$

$$\tan\frac{\epsilon_{k+1,p}}{2} = \frac{n_k\sqrt{n_k^2 \sin^2\gamma_k - 1}}{\cos\gamma_k} \quad (12)$$

Designating the reflectance of the S polarization component at the j-th surface as $\rho_{js}$ and that of the P polarization component as $\rho_{jp}$, then these are respectively expressed as follows:

$$\rho_{js} = \frac{n_{j-1}\cos\gamma_{j-1} - n_j\cos\gamma_j}{n_{j-1}\cos\gamma_{j-1} + n_j\cos\gamma_j} \quad (13)$$

$$\rho_{jp} = \frac{n_j\cos\gamma_{j-1} - n_{j-1}\cos\gamma_j}{n_j\cos\gamma_{j-1} + n_{j-1}\cos\gamma_j} \quad (14)$$

The respective reflectances of the S and P polarization components at the j-th equivalent surface will be designated as $r_{jS}$ and $r_{jP}$ respectively. These are determined by the reflectances at the j-th surface, the reflectances at the (j+1)-th equivalent surface, and interference action which occurs within the j-th layer, and are respectively expressed as follows:

$$r_{js} = \frac{\rho_{js} + r_{j+1,s}\exp(-i\beta_j)}{1 + \rho_{js}r_{j+1,s}\exp(-i\beta_j)} \quad (15)$$

$$r_{jp} = \frac{\rho_{jp} + r_{j+1,p}\exp(-i\beta_j)}{1 + \rho_{jp}r_{j+1,p}\exp(-i\beta_j)} \quad (16)$$

In the above, $\beta_j$ designates the change in phase of light rays which make one return journey between the j-th surface and the (j+1)-th surface. Designating the refractive index of the j-th layer as $n_j$, the thickness of each layer as $d_j$, the refraction angle of light rays which propagate from the j-th surface towards the (j+1)-th surface as $\gamma_j$, the wavelength of light waves in air as $\lambda$, then $\beta_j$ is expressed as follows:

$$\beta_j = \frac{4\pi n_j d_j}{\lambda}\cos\gamma_j \quad (17)$$

Assuming that there is no absorption of light within the film layers, and designating the changes in phase at the j-th equivalent surface as $\epsilon_{js}$ and $\epsilon_{jp}$, then equations (15) and (16) can be respectively expressed in the following forms:

$$r_{js} = \exp(i\epsilon_{js}) \quad (18)$$

$$r_{jp} = \exp(i\epsilon_{jp}) \quad (19)$$

By separating the real and imaginary parts, comparing the equations (15) and (18), comparing the equations (16) and (19), and using equations (13) and (14), the phase changes in the S and P polarization components which occur at the j-th equivalent surface can be expressed as follows:

$$\tan\frac{\epsilon_{js}}{2} = \frac{n_j\cos\gamma_j}{n_{j-1}\cos\gamma_{j-1}}\tan\frac{\epsilon_{j+1,s} - \beta_j}{2} \quad (20)$$

$$\tan\frac{\epsilon_{jp}}{2} = \frac{n_{j-1}\cos\gamma_j}{n_j\cos\gamma_{j-1}}\tan\frac{\epsilon_{j+1,p} - \beta_j}{2} \quad (21)$$

By obtaining the phase changes $\epsilon_{k+1,S}$ and $\epsilon_{k+1,P}$ which occur at the final surface through using equation (12), then by calculating iteratively backward, using the cumulative equations (20) and (21), the phase changes $\epsilon_{1S}$ and $\epsilon_{1P}$ which occur at the first equivalent surface (i.e. the phase change for the overall multi-layer optical thin film) can be obtained. The phase difference $\delta$ for reflection by the entire multi-layer optical thin film is obtained as follows:

$$\delta = \epsilon_{1P} - \epsilon_{1S} \quad (22)$$

We shall consider the case in which $\delta$ is to be zero, i.e.

$$\epsilon_{1P} = \epsilon_{1S} \quad (23)$$

It will be assumed that $\beta_j$ is equal to $\pi$, for all of the layers, from the first to the k-th layer. By using the value of $\pi$ for $\beta_j$ in executing iterative calculations using the cumulative equations (20) and (21), and using the equations (11), (12) and (23), the following relationship can be obtained:

$$\sqrt{n_0} = \begin{cases} \dfrac{n_1 n_3 \ldots n_k}{n_2 n_4 \ldots n_{k-1}} & (k:\ odd) \\ \dfrac{n_1 n_3 \ldots n_{k-1}}{n_2 n_4 \ldots n_k} & (k:\ even) \end{cases} \quad (24)$$

Furthermore, by inserting the value $\pi$ for $\beta_j$ in equation (17), and assuming that the main wavelength (i.e. the nominal wavelength) of the light is $\lambda_c$, then the following relationship is obtained:

$$d_j = \frac{\lambda_c}{4n_j\cos\gamma_j} \quad (25)$$

If the relationships (24) and (25) are satisfied, then the phase difference $\delta$ becomes $0°$ at the main wavelength $\lambda_c$. If only a single optical thin film is utilized instead of a multi-layer optical thin film, then the following is obtained, by using the value 1 for k in equation (24):

$$n_1 = \sqrt{n_0} \quad (26)$$

Since there is no type of optical thin film presently available which will satisfy the above condition, it is not possible to achieve a value of phase difference of $0°$ by using only a single-layer optical thin film. However if a single optical thin film is used having a refractive index which is lower than that of the transparent prism T, then the value of the phase difference $\delta$ can be made smaller than for the case in which no optical thin film is formed. If a double-layer optical thin film is used, then the following is obtained by setting the value of k to 2, in equation (24):

$$\frac{n_1}{n_2} = \sqrt{n_0} \quad (27)$$

If the conditions of equations (25) and (27) are satisfied, then the phase difference $\delta$ becomes zero. Since $n_o > 1$, then $n_1 > n_2$ in equation (27). That is to say, the refractive index of the first layer of optical thin film should be high, and that of the second layer should be lower than the refractive index of the first layer.

The greater the number of layers in the multi-layer optical thin film, the greater will become the range of possible values for the refractive index of the respective layers. Thus it can be understood that the phase difference can easily be made as small as required.

Designating the main wavelength of the light as $\lambda_c$, and assuming that the value of $\beta_m$ (for the m-th layer) is $2\pi$, and is $\pi$ for the remaining layers, then the following relationship can be obtained from equation (17) by inserting the values $j=m$ and $\beta_m = 2\pi$:

$$d_m = \frac{\lambda_c}{2n_m\cos\gamma_m} \quad (28)$$

Next, by executing the aforementioned iterative calculations using the equations (20), (21), with the values $\beta_m = 2\pi$ and $\beta_j=\pi$, (where $j\neq m$), it is found that the value of the phase difference $\delta$ becomes zero, irrespective of the refractive index of the m-th layer. In the case of a multi-layer optical thin film in which each of the layers has the value $\beta$ equal to $\pi$ then even if an optical layer having the value $\beta$ equal to $2\pi$ is inserted between any arbitrary pair of the other layers, the phase difference for the multi-layer optical thin film at the main wavelength will remain zero. However at wavelengths other than the main wavelength, the phase difference will be non-zero. It is possible to use that to reduce the wavelength dependency of the phase difference of the multi-layer optical thin film, by inserting one or more additional films each having a value of $\beta$ equal to $2\pi$ at the main wavelength.

A specific embodiment of a polarization plane rotator according to the present invention will now be described, referring to FIG. 4, which is an oblique general view of the embodiment. This consists of a prism 101 having the form described above referring to FIG. 1, i.e. having a triangular cross-sectional shape consisting of a right angle with the remaining two angles being mutually equal. The lateral surface which connects the apexes of the two equal angles is designated as the first surface 102, and the remaining two lateral surfaces are designated as the second surface 103 and third surface 104. The prism 101 is formed of glass, having a refractive index of 1.52, and the external medium is air.

Figure 5:
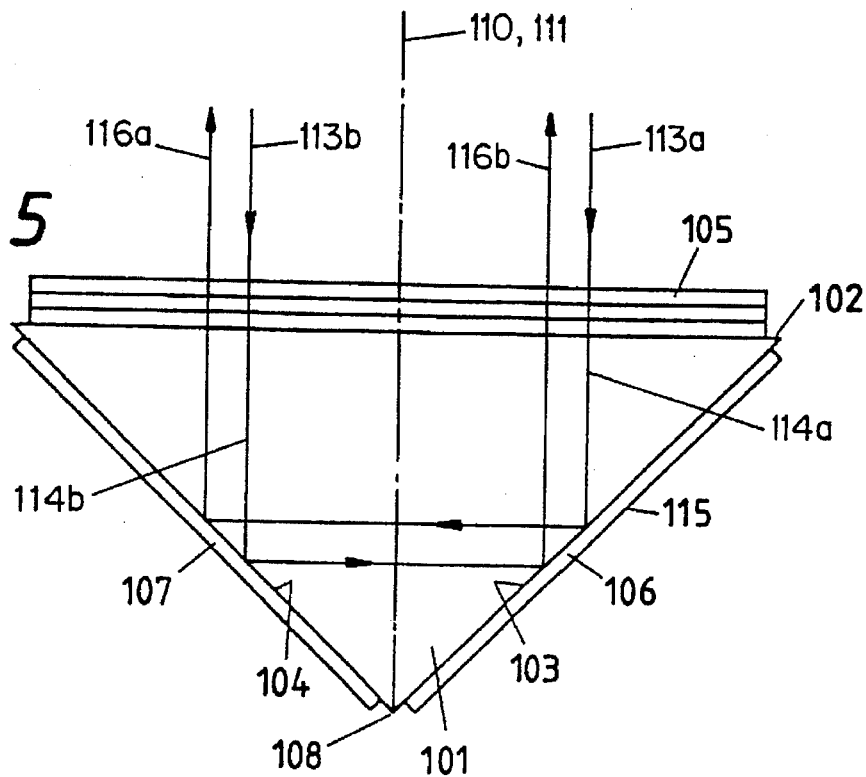
FIG. 5 is a cross-sectional view of the first embodiment, illustrating respective optical thin films formed on the first embodiment of a polarization plane rotator.

FIG. 5 is a cross-sectional view of this embodiment, taken in a plane perpendicular to the surfaces 102, 103, 104. As shown, the first surface 102 has a three-layer optical thin film 105 formed thereon, to reduce reflection of the S and P polarization components of incident light. These layers will be designated as the first layer, second layer and third layer respectively, proceeding successively outward from the surface 102. The second surface 103 and third surface 104 have respective single-layer optical thin films 106, 107 formed thereon, for reducing the phase difference $\delta$ between the P and S polarization components as described hereinabove. The configuration of the multi-layer optical thin film 105 formed on the first surface 102 is shown in Table 1 below, while the configuration of each of the films 106, 107 formed on the second surface 103 and third surfIce 104 respectively, is shown in the Table 2 below. The plane 109, which passes through the line of intersection between the second surface 103 and third surface 104 and is perpendicular to the first surface 102, will be designated as the reference plane. Numeral 110 denotes an axis of incident light which is within the reference plane 109, and 111 denotes the axis of the resultant light that is emitted from the first surface 102, which is also within the reference plane 109. There is an angle of 45° between a line 112 (within the plane 109) which is normal to the first surface 102 and the incident light axis 110, while similarly there is an angle of 45° between the line 112 and the emitted light axis 111.

Figure 4:
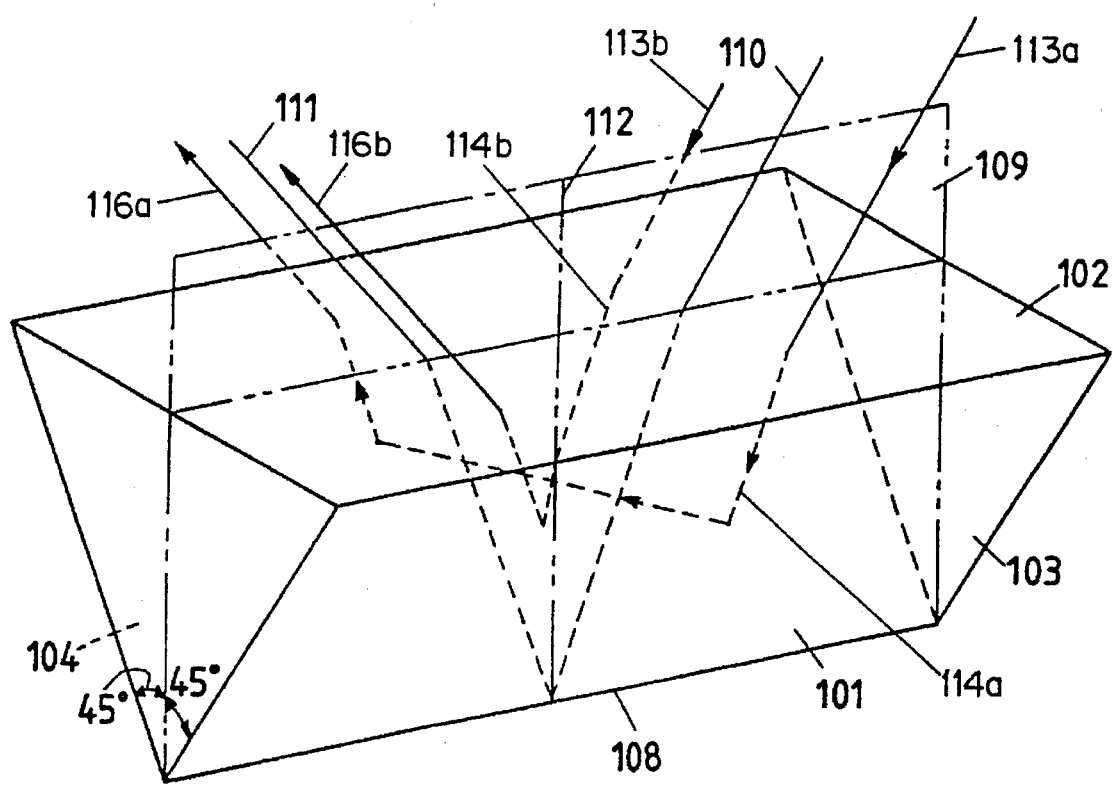
FIG. 4 is an oblique view showing the configuration of a first embodiment of a polarization plane rotator according to the present invention.

As shown in FIG. 4, light rays 113a, 113b which are incident on the first surface 102 and are parallel to the axis 110 are refracted at the first surface 102, then is incident on the second surface 103 or the third surface 104. If the light ray 114a is incident on the second surface 103, it is then reflected at that surface and is then reflected by the third surface 104, to be again refracted at the first surface 102, with the resultant emitted light ray 116a being parallel to the emitted light axis 111. A light ray 114b which is incident on the third surface 104 will be reflected at that surface and then reflected by the second surface 103, to be again refracted at the first surface 102, with the resultant emitted light ray 116b being parallel to the emitted light axis 111. From the above equations (1) and (8), it is found that when such a light ray is incident on the boundary surface 103 between the prism 101 and the optical thin film 106, the angle of incidence is 51.2°.

TABLE 1

$\theta_1 = 45.0°$

| Item | Material | Refractive Index | Thickness (nm) |
|---|---|---|---|
| Prism | Glass | 1.52 | — |
| First layer | Al$_2$O$_3$ | 1.62 | 90.3 |
| Second layer | ZrTiO$_4$ | 2.10 | 128.1 |
| Third layer | MgF$_2$ | 1.39 | 105.2 |
| External medium | Air | 1.00 | — |

TABLE 2

$\theta_2 = 51.2°$

| Item | Material | Refractive Index | Thickness (nm) |
|---|---|---|---|
| Prism | Glass | 1.52 | — |
| first layer | MgF$_2$ | 1.39 | 158.1 |
| External medium | Air | 1.00 | — |

Since the critical angle of incidence for total reflection at that second surface 103 is 66.1°, there are some light rays which will be transmitted through the second surface 103. From equation (10), a light ray which is incident on the boundary surface 115 between the optical thin film 106 and the external air will have an angle of incidence of 58.5°. Hence, since the critical angle of incidence for total reflection at the boundary surface 115 is 46.0°, total reflection will occur at the boundary surface 115. The same action occurs at the optical thin film 107 formed on the third surface 104.

With the configuration shown in FIG. 4, 5 even if incident light rays 113a, 113b are not parallel to the incident light axis 110, a light ray 116a which is successively propagated from the second surface 103 and third surface 104, to be then emitted from the first surface 102, and light ray 116b which is successively propagated from the third surface 104 to the second surface 103 and then emitted from the first surface 102, will be mutually parallel. So long as the angle between an incident light rays 113a, 113b and the incident light axis 110 is not excessively large, the optical thin films 106, 107 formed on the second surface 103 and third surface 104 respectively will achieve substantially the same reflection operation as has been described hereinabove for the case in which the incident light rays 113a, 113b are parallel to the incident light axis 110.

Figure 6:
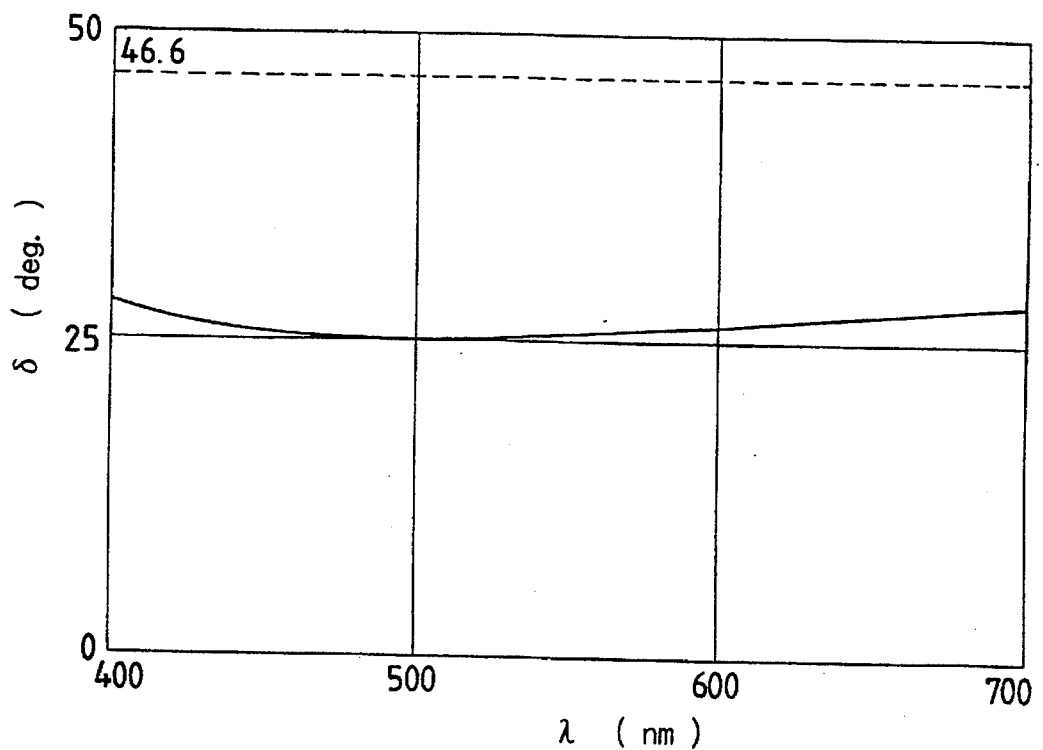
FIG. 6 is a graph illustrating wavelength dependency of phase difference, for light internally reflected at a second surface and third surface of the first embodiment of a polarization plane rotator.
Figure 7:
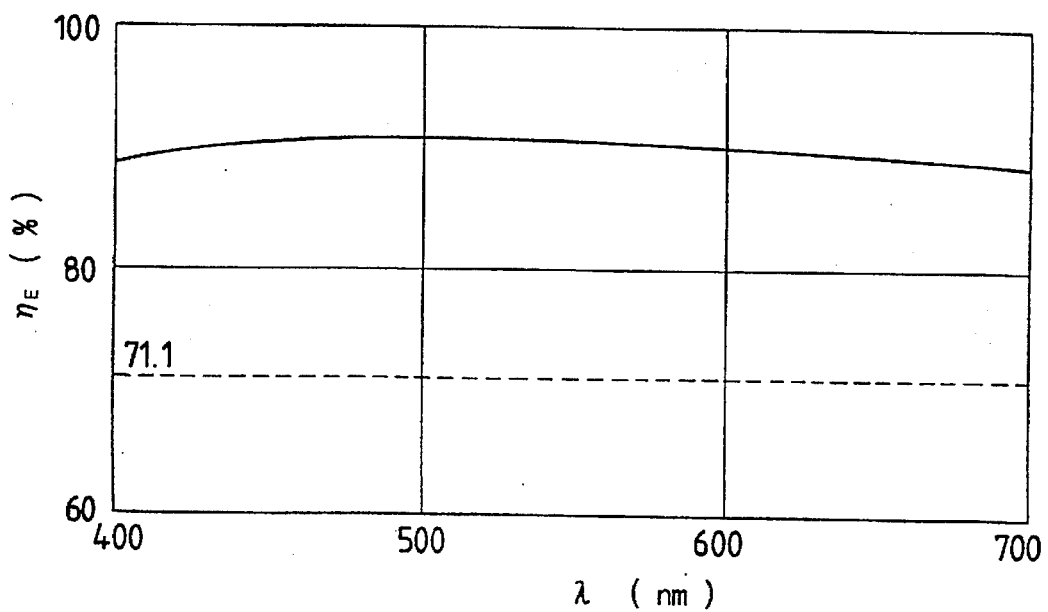
FIG. 7 is a graph illustrating wavelength dependency of a phase difference merit factor, for the first embodiment of a polarization plane rotator.

If the incident light rays 113a, 113b are parallel to the incident light axis 110, then the wavelength dependency of the relative phase difference $\delta$ for the reflections at the surfaces 103, 104 (i.e. phase difference between the S and P components of the emitted light from the prism, assuming that the corresponding phase difference of the incident light is 0°) will be as shown in the full-line curve in FIG. 6. For purposes of comparison, the corresponding characteristic for the case in which the optical thin films 106, 107 are not formed on the second surface 103 and third surface 104 is shown by the broken-line curve in FIG. 6. As can be understood from FIG. 6, as a result of forming the optical thin films 106, 107, the phase difference $\delta$ is made small, and varies only slightly in accordance with the wavelength of the light. The wavelength dependency of the phase difference merit factor $\eta_E$ is illustrated by the full-line curve in FIG. 7, while the corresponding characteristic for the case in which the optical thin films 106, 107 are not formed on the second surface 103 and third surface 104 is shown by the broken-line curve in FIG. 7. As can be seen from FIG. 7, there is a very substantial improvement in the phase difference merit factor $\eta_E$ as a result of forming the optical thin films 106 and 107, while the degree of wavelength dependency of that merit factor $\eta_E$ is small. Hence, when linearly polarized light is incident on the first surface 102, with the light rays being reflected at the second surface 103 and third surface 104 and then emitted through the first surface 102, the emitted light will be substantially close to the condition of linear polarization, for a wide range of different wavelengths.

Figure 8:
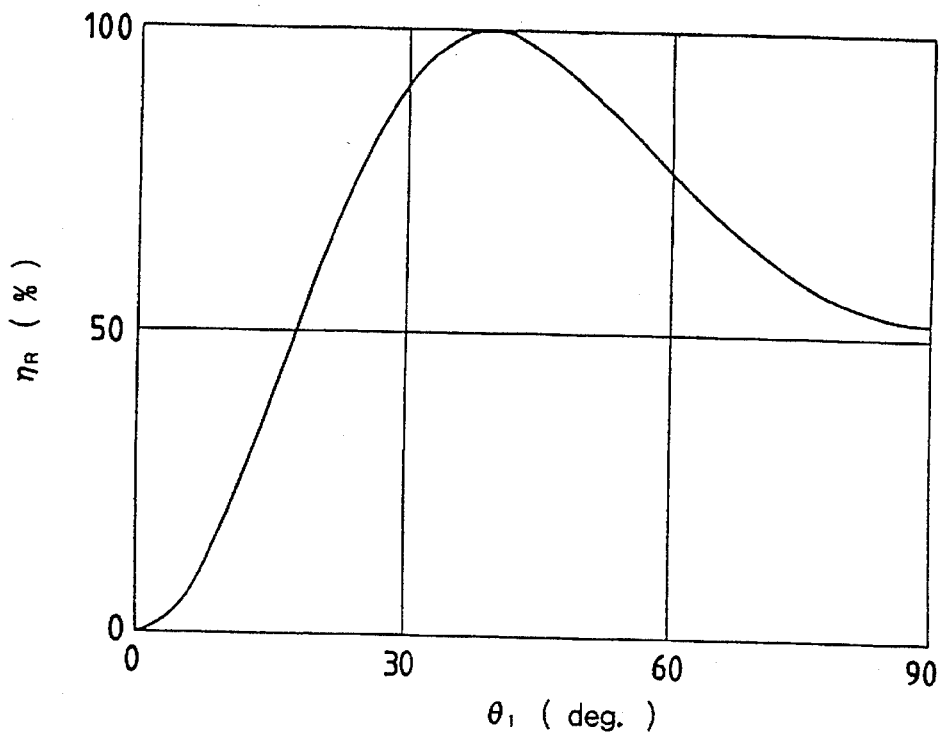
FIG. 8 is a graph illustrating wavelength dependency of a polarization plane rotation merit factor, for the first embodiment of a polarization plane rotator.

FIG. 8 shows the incidence angle dependency of the polarization plane rotation merit factor $\eta_R$ on the angle of incidence, for the case in which the incident light rays on the first surface 102 are parallel to the reference plane 109. If $\theta_1 = 39.0°$, then $\eta_R$ is at a maximum, while if $\theta_1$ is 45° then $\eta_R$ becomes 0.971, i.e. becomes very close to 1. Thus if the incident light rays on the first surface 102 are parallel to the incident light axis 110 and have a plane of polarization that is perpendicular to the reference plane 109, then due to the successive rotations of the plane of polarization which occur at the two total reflections (at the surfaces 103 and 104), the resultant light rays which are emitted to the exterior from the first surface 102 will have a plane of polarization that is close to being parallel to the reference plane 109.

Figure 9:
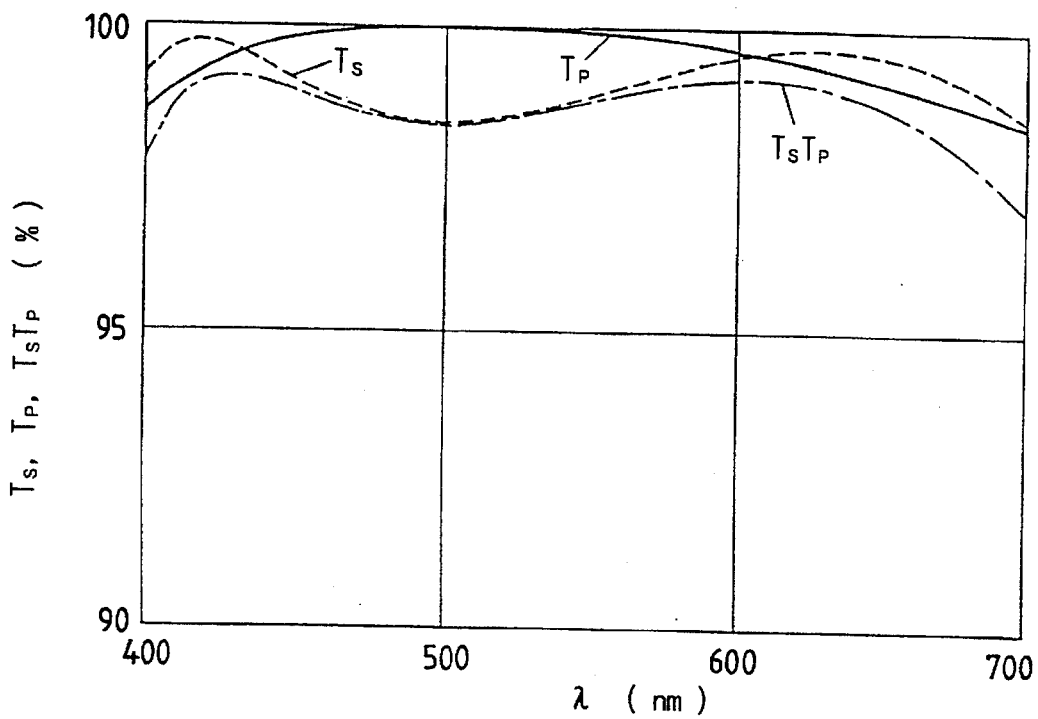
FIG. 9 is a graph illustrating wavelength dependency of transmittance of a first surface of the first embodiment of a polarization plane rotator.

Of the S and P polarization components, since one of these components is incident on the first surface 102 and the other component is subsequently emitted from the first surface 102, it is essential to achieve high values of transmittance for each of the polarization components Ts and Tp respectively of the S and P components, at the surface 102. If the first surface 102 is exposed to the air, and the angle of incidence of light falling on that surface is 45°, then since that angle is close to the Brewster's angle (56.7°), Tp will be very high, however Ts will not be high. For that reason a three layer optical thin film 105 is formed on the surface 102, by evaporative deposition, as an anti-reflection coating. FIG. 9 shows the wavelength dependency of each of the transmittances Ts and Tp, and the product of these (Tp Ts), expressed as percentage values. As can be seen from FIG. 9, the transmittance values Tp and Ts at the first surface 102 are each very close to 100%, throughout the range of wavelengths shown.

As described above, using a polarization plane rotator according to the present invention, it becomes possible to convert linearly polarized light having a plane of polarization that is perpendicular to the reference plane 109 into linearly polarized light having a plane of polarization that is close being parallel to the reference plane 109. Conversely, the polarization plane rotator can convert linearly polarized light having a plane of polarization that is parallel to the reference plane 109 into linearly polarized light in which the plane of polarization is close to being perpendicular to the reference plane 109.

The prism 101 and each of the optical thin films 105, 106, 107 should preferably each be capable of withstanding high temperatures, so that the the polarization plane rotator will be capable of high-temperature operation. In that case, the polarization plane rotator can be positioned closely adjacent to a powerful source of light.

With the configuration shown in FIG. 4, it is possible for the apex angle between the second surface 103 and third surface 104 to differ slightly from 90°. In that case, the light emitted from the prism 101 will consist of two different beams of light. If the angle is greater than 90°, then these two beams will gradually diverge as they propagate through the air, whereas if the apex angle is less than 90° then the two beams will mutually overlap, after having propagated through a certain distance.

Figure 10:
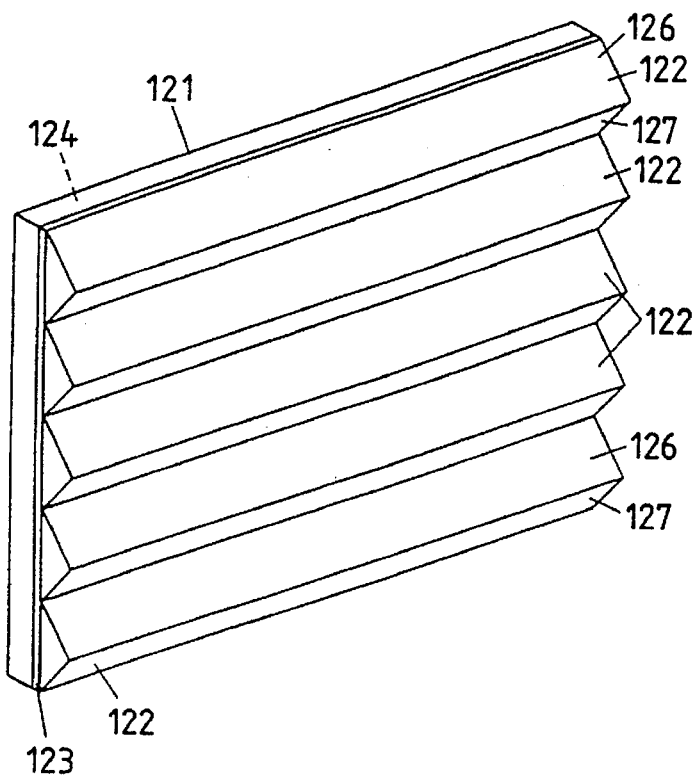
FIG. 10 is an oblique view of a second embodiment of a polarization plane rotator according to the present invention.
Figure 11:
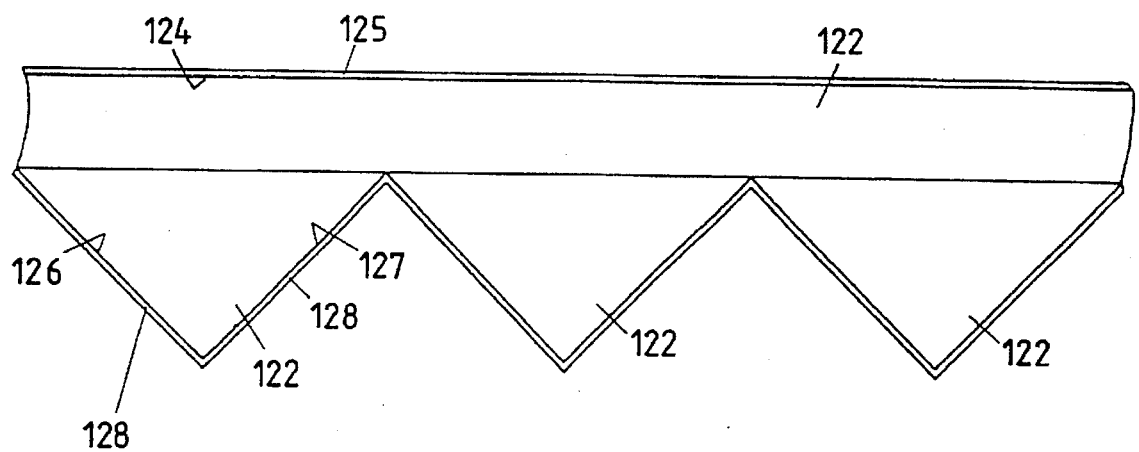
FIG. 11 is a partial cross-sectional view of the second embodiment of a polarization plane rotator.

FIG. 10 is an oblique view of a second embodiment of a polarization plane rotator according to the present invention. This is formed of a transparent plate 121 and plurality of small, narrow elongated triangular transparent prism elements 122 which are arrayed mutually parallel at regular spacings on one surface of the transparent plate 121. The transparent plate 121 and the prism elements 122 are each formed of optical glass, and are mutually attached by a transparent adhesive material 123. Each of the prism elements 122 has a similar configuration to the prism 101 of the first embodiment, with the two inclined surfaces 126, 127 of each prism element 122 having identical areas and intersecting at a right angle, and sloping at identical angles of inclination to the surface of the transparent plate 121 on which they are mounted. The transparent plate 121 and each of the prism elements 122 has a refractive index that is close to 1.52. As shown in FIG. 11, a three layer optical thin film 125 is formed as an anti-reflection coating, by evaporative deposition, on the surface 124 of the transparent plate 121 which is on the opposite side of that plate from the prism elements 122. In addition, double-layer optical thin films 128 are formed by evaporative deposition on the external surfaces 126, 127 of each of the prism elements 122, to ensure that the phase difference between polarization components of light reflected internally at these surfaces will be sufficiently small, as described hereinabove. The configuration of the optical thin film 125 is identical to that shown in Table 1 above, while the configuration of the optical thin film 128 is shown in the Table 3 below.

TABLE 3

$\theta_2 = 51.2°$

| Item | Material | Refractive Index | Thickness (nm) |
| --- | --- | --- | --- |
| Prism | Glass | 1.52 | — |
| first layer | SiO | 1.70 | 102.5 |
| second layer | MgF$_2$ | 1.39 | 171.9 |
| External medium | Air | 1.00 | — |

Figure 12:
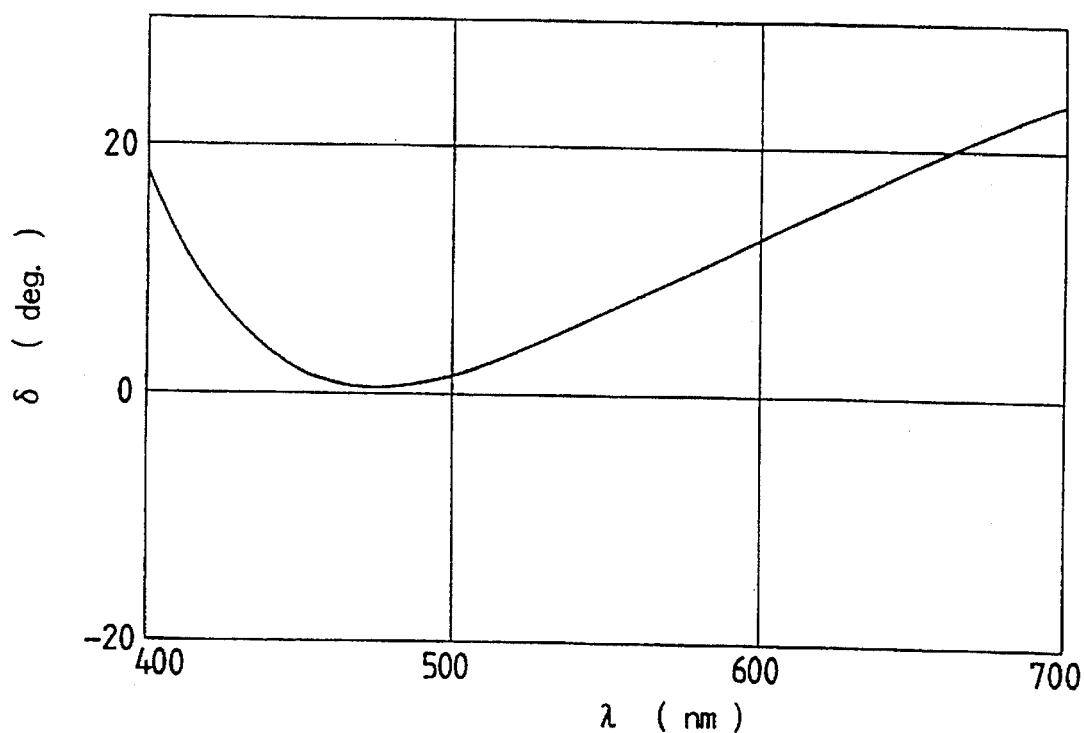
FIG. 12 is a graph illustrating wavelength dependency of phase difference, for light internally reflected at a second surface and third surface of the second embodiment of a polarization plane rotator.
Figure 13:
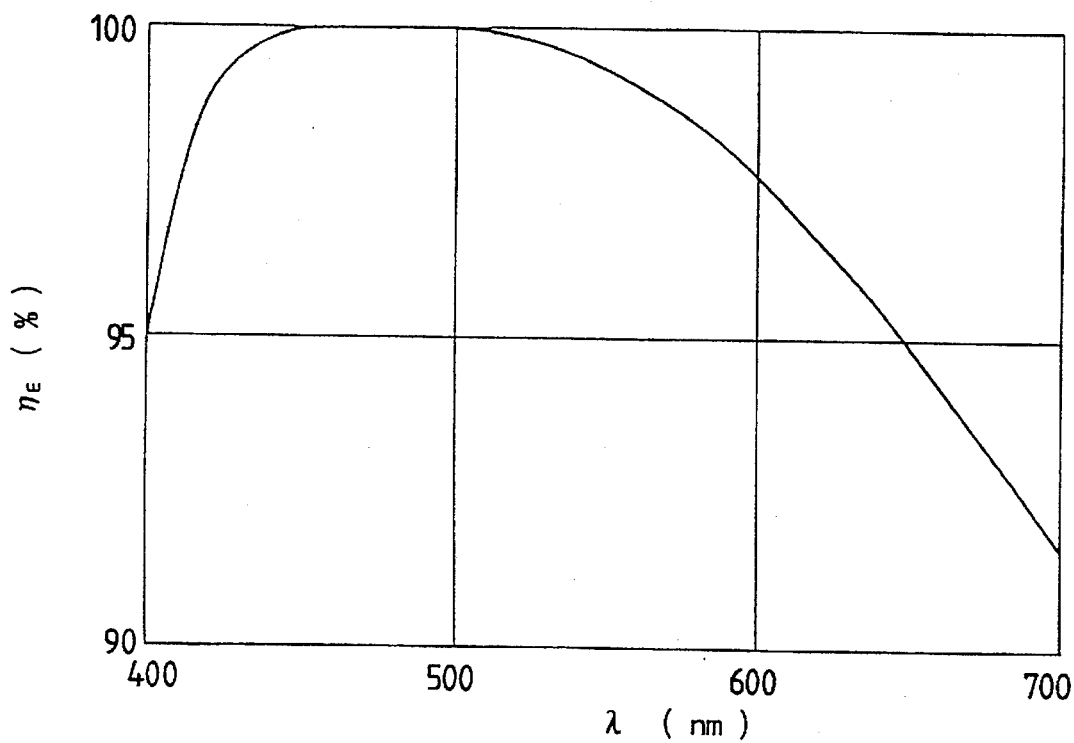
FIG. 13 is a graph illustrating wavelength dependency of a phase difference merit factor, for the second embodiment of a polarization plane rotator.

The wavelength dependency of the phase difference $\delta$ for the surfaces 126, 127 of each of the prism elements 122 is shown in FIG. 12, while the wavelength dependency of the phase difference merit factor $\eta_E$ is shown in FIG. 13. By comparing FIG. 12 with FIG. 6, and comparing FIG. 13 with FIG. 7, it can be seen that by forming a double-layer optical thin film rather than a single-layer optical thin film on each prism, the internal reflection phase difference $\delta$ can be made substantially smaller, while the phase difference merit factor $\eta_E$ can be substantially increased.

The action performed by the embodiment of FIG. 10 is identical to that of the embodiment of FIG. 4 described hereinabove. The external dimensions of the array of prism elements 122 is 30 mm (vertical) by 60 mm (horizontal), and the pitch of the prism elements 122 is 7 mm. It can thus be understood that the configuration of this embodiment enables the polarization plane rotator to be made thinner and lighter than is possible with that of FIG. 4, while in addition the internal optical path along which a light ray propagates within the polarization plane rotator can be made substantially shorter than in the case of the embodiment of FIG. 4.

If the operating temperature of this embodiment will exceed 100° C., then it is preferable to use a transparent silicon resin in the form of a gel, as the transparent adhesive material 123, for example the KE1051 material manufactured by the Shin-Etsu Chemical Co., Ltd. The KE1051 material is supplied as two separate liquid materials, which when mixed, harden as a gel, if left at room temperature or if heated. The maximum usable temperature of such an adhesive material is 200° C.

Figure 14:
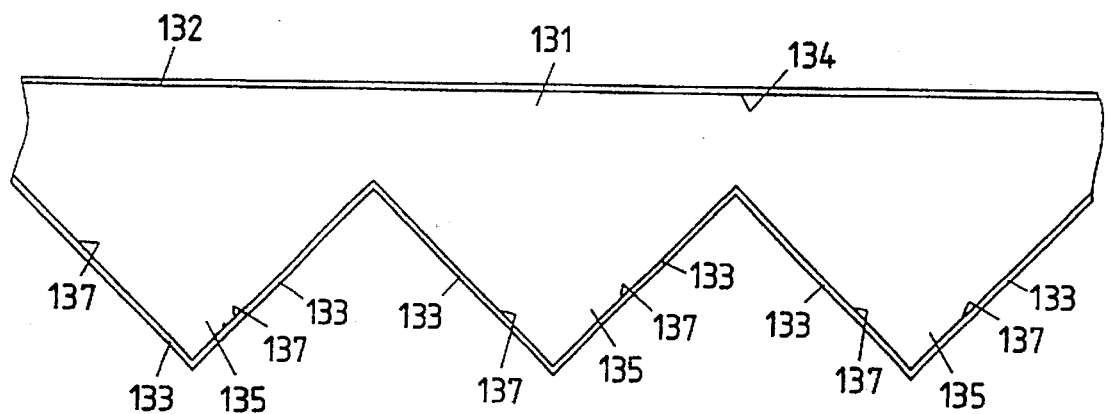
FIG. 14 is a partial cross-sectional view of a third embodiment of a polarization plane rotator according to the present invention.

FIG. 14 shows the configuration of a third embodiment of a polarization plane rotator according to the present invention. This embodiment is basically similar to that of FIG. 10 described above, and for that reason is shown only in partial cross-sectional view in FIG. 14. This embodiment differs from that of FIG. 10 in that the polarization plane rotator is formed integrally from a single plate of glass, which will be referred to as the prism plate 131. The prism plate 131 is formed with a plane front surface 134 having an optical film 132 deposited thereon, and has the opposite surface formed with an array of small elongated triangular prism elements 135, disposed mutually parallel at regular spacings. The surfaces 137 of these prism elements 135 have deposited thereon an optical thin film 133. The glass of the prism plate of this embodiment has a refractive index of 1.52.

The prism plate 131 can be formed to the required shape by using a mold having internal surfaces shaped with a suitable zig-zag contour, and pressing a thermally softened glass plate or glass block into the mold. If any surface irregularities such as small dents are left on the plane surface 134 after such a molding operation, these are removed by polishing, to form a flat surface.

The optical thin film 132 is formed by evaporative deposition on the plane surface 134 as an anti-reflection coating, and has the configuration shown in the Table 1 above. The optical thin films 133, formed on the plane surfaces 137 of the prism elements 135 to reduce the internal reflection phase difference at these surfaces as described hereinabove, is a three-layer optical thin film formed by evaporative deposition, and has the configuration shown in the Table 4 below.

TABLE 4

$\theta_2 = 51.2°$

| Item | Material | Refractive Index | Thickness (nm) |
|---|---|---|---|
| Prism | Glass | 1.52 | — |
| First layer | $Y_2O_3$ | 1.78 | 86.6 |
| Second layer | $ZrTiO_4$ | 2.10 | 66.1 |
| Third layer | $MgF_2$ | 1.39 | 158.1 |
| External medium | Air | 1.00 | — |

Figure 15:
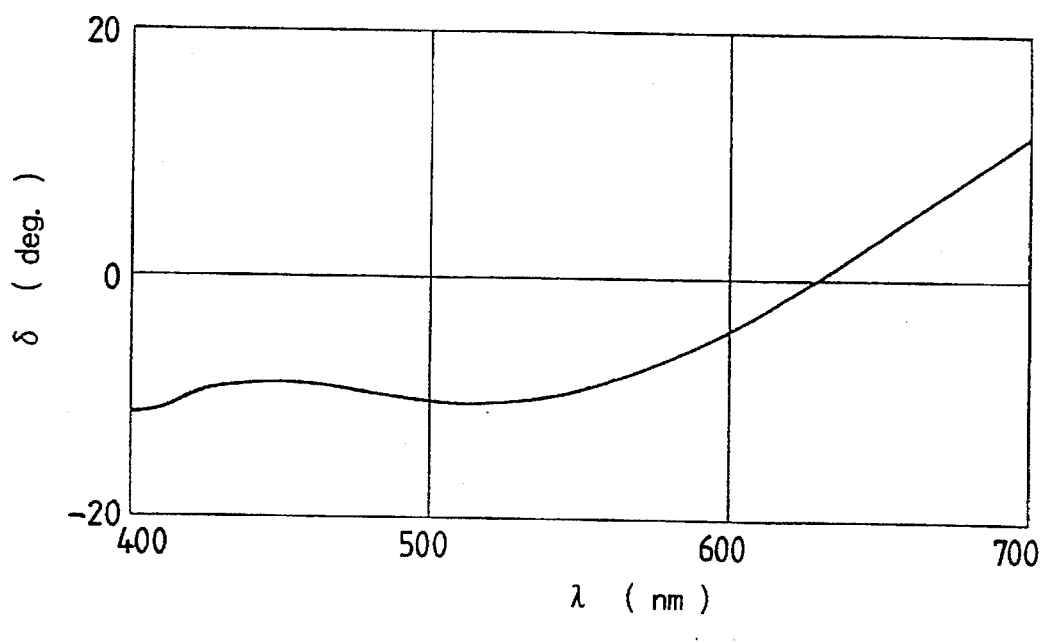
FIG. 15 is a graph illustrating wavelength dependency of phase difference, for light internally reflected at a second surface and third surface of the third embodiment of a polarization plane rotator.
Figure 16:
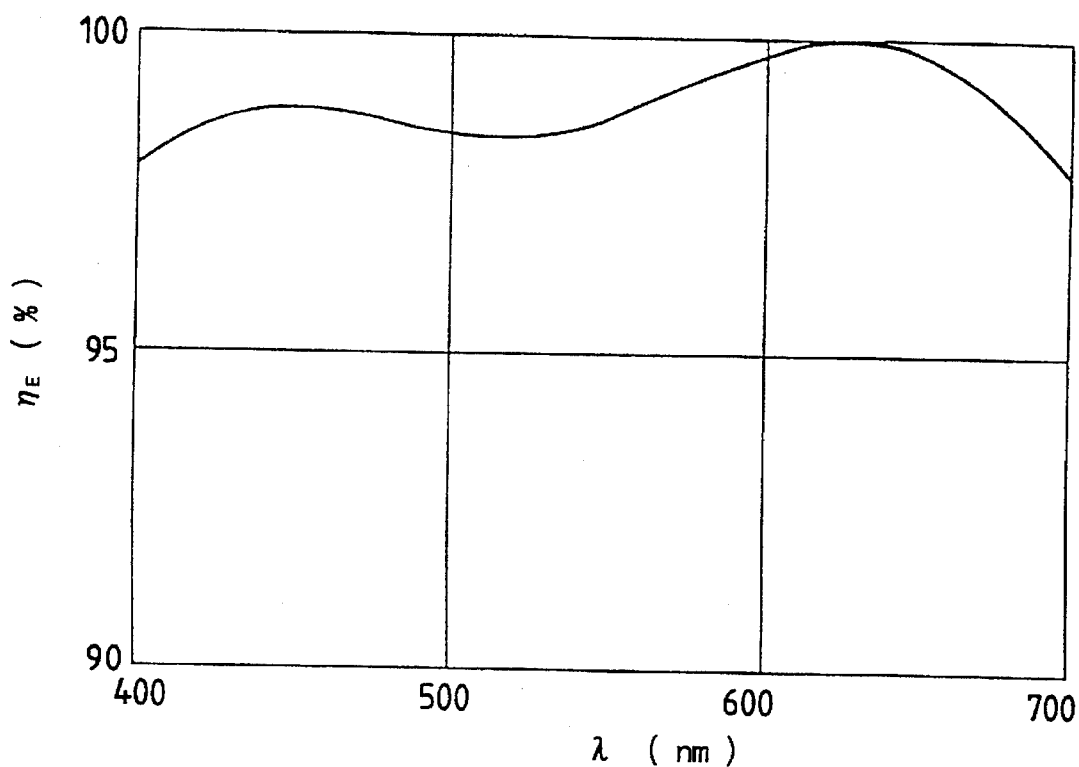
FIG. 16 is a graph illustrating wavelength dependency of a phase difference merit factor, for the third embodiment of a polarization plane rotator.

The wavelength dependency of the phase difference δ for the surfaces 137 is shown in FIG. 15, while the wavelength dependency of the phase difference merit factor $\eta_E$ is shown in the graph of FIG. 16. Comparing FIGS. 16 and 13, it can be seen that the wavelength dependency of the phase difference merit factor $\eta_E$ is made more flat when a three-layer optical thin film is formed on the surfaces of the prism elements, than when a double-layer optical thin film is used.

A fourth embodiment of a polarization plane rotator according to the present invention will be described, which has an identical configuration to the embodiment of FIG. 14, and differs from the embodiment of FIG. 14 only with respect to the optical thin film 133. The configuration of the optical thin film 133 of the fourth embodiment is shown in the Table 5 below. In this case the respective thicknesses of the layers of the optical thin film 133 have the values, at the main wavelength of light, $\beta_1=\pi$, $\beta_2=2\pi$, $\beta_3=\pi$. With each of the first through third embodiments of polarization plane rotators described above, each of the layers of the optical thin film that is formed on the surfaces of the prism elements has the same value of $\beta_i$, i.e. $\pi$. However with the fourth embodiment, the value of $\beta_2$ at the main wavelength is $2\pi$ for the second layer. As described hereinabove, incorporation of such an intermediate layer, between other layers each having a thickness equivalent to $\pi$, enables the wavelength dependency of the phase difference δ to be reduced.

Figure 17:
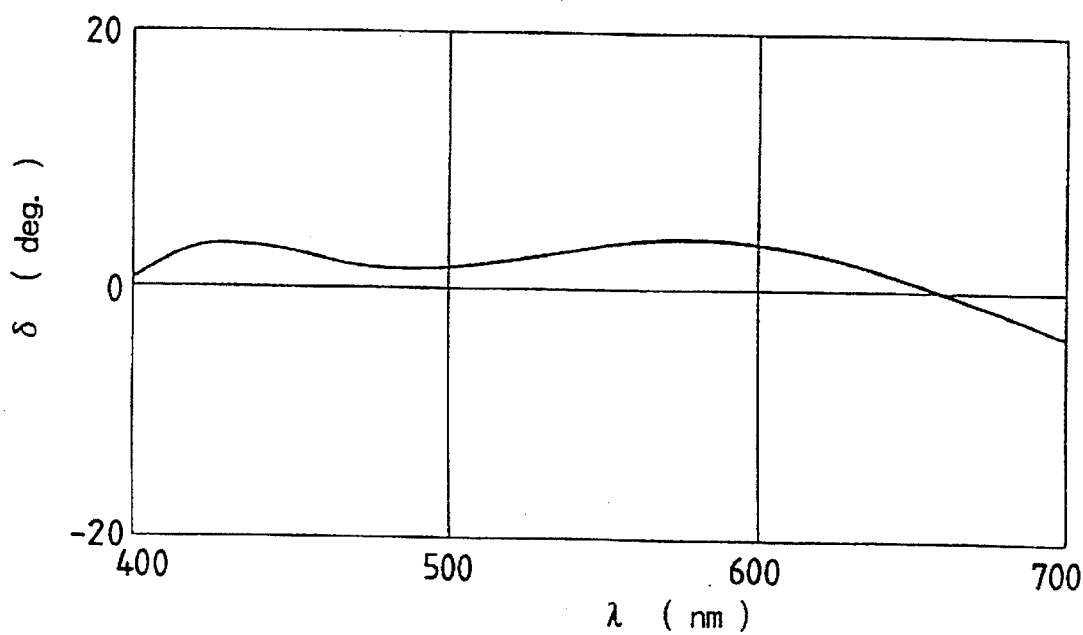
FIG. 17 is a graph illustrating wavelength dependency of phase difference, for light internally reflected at a second surface and third surface of a fourth embodiment of a polarization plane rotator according to the present invention.
Figure 18:
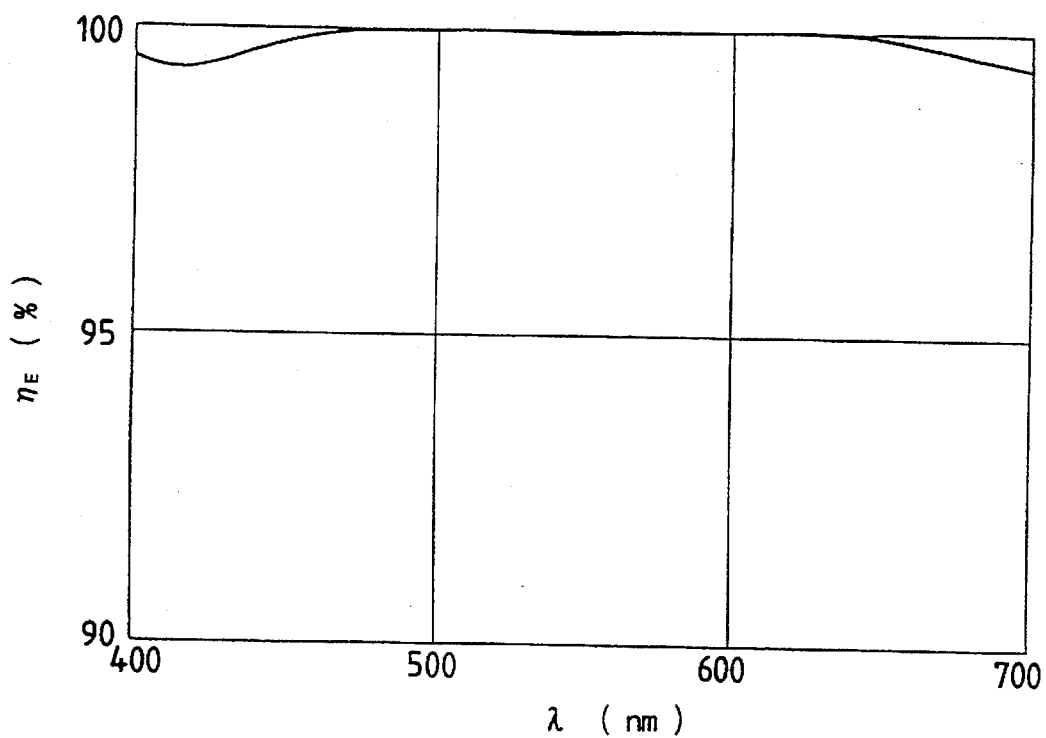
FIG. 18 is a graph illustrating wavelength dependency of a phase difference merit factor, for the fourth embodiment of a polarization plane rotator.

The wavelength dependency of the phase difference δ for the prism surfaces 137 of the fourth embodiment is shown in FIG. 17, and the corresponding wavelength dependency of the phase difference merit factor $\eta_E$, as shown in FIG. 18, is extremely flat.

TABLE 5

$\theta_2 = 51.2°$

| Item | Material | Refractive Index | Thickness (nm) |
|---|---|---|---|
| Prism | Glass | 1.52 | — |
| First layer | $Y_2O_3$ | 1.78 | 101.4 |
| Second layer | $ZrTiO_4$ | 2.10 | 144.2 |
| Third layer | $MgF_2$ | 1.39 | 171.9 |
| External medium | Air | 1.00 | — |

A fifth embodiment of a polarization plane rotator according to the present invention will be described, which has a similar configuration to that shown in FIG. 14, but differs in the configurations of the optical thin films 132, 133, and in that the prism plate 131 of the fifth embodiment is formed of glass which has a refractive index of 1.71. The configurations of the optical thin films 132 and 133 of this embodiment are shown in the Table 6 and Table 7 below, respectively.

Figure 19:
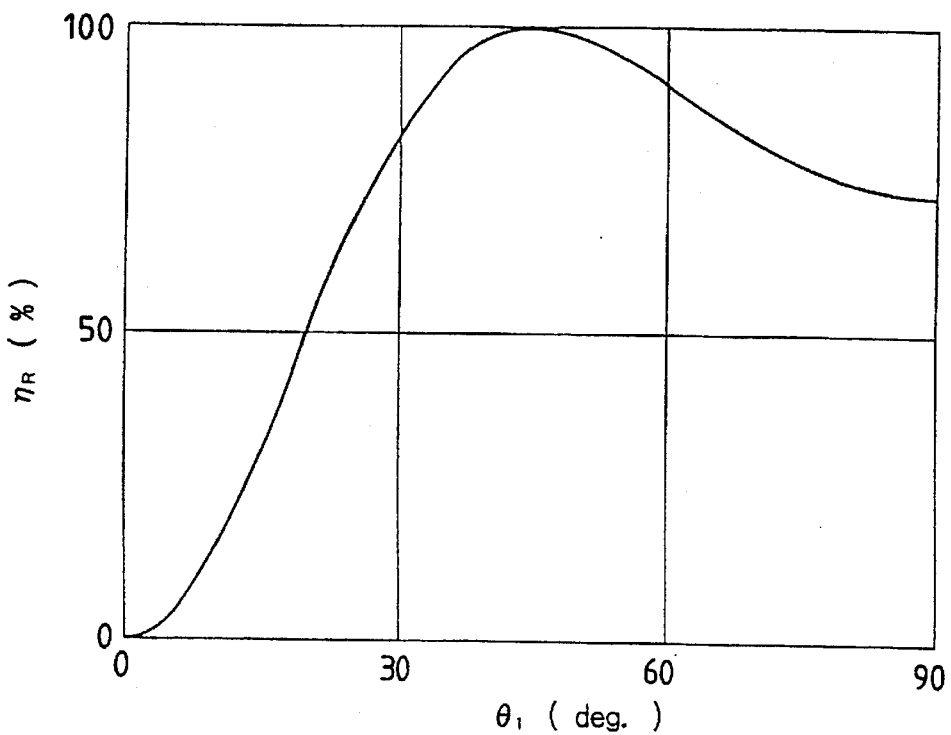
FIG. 19 is a graph illustrating incidence angle dependency, for a fifth embodiment of a polarization plane rotator according to the present invention.
Figure 20:
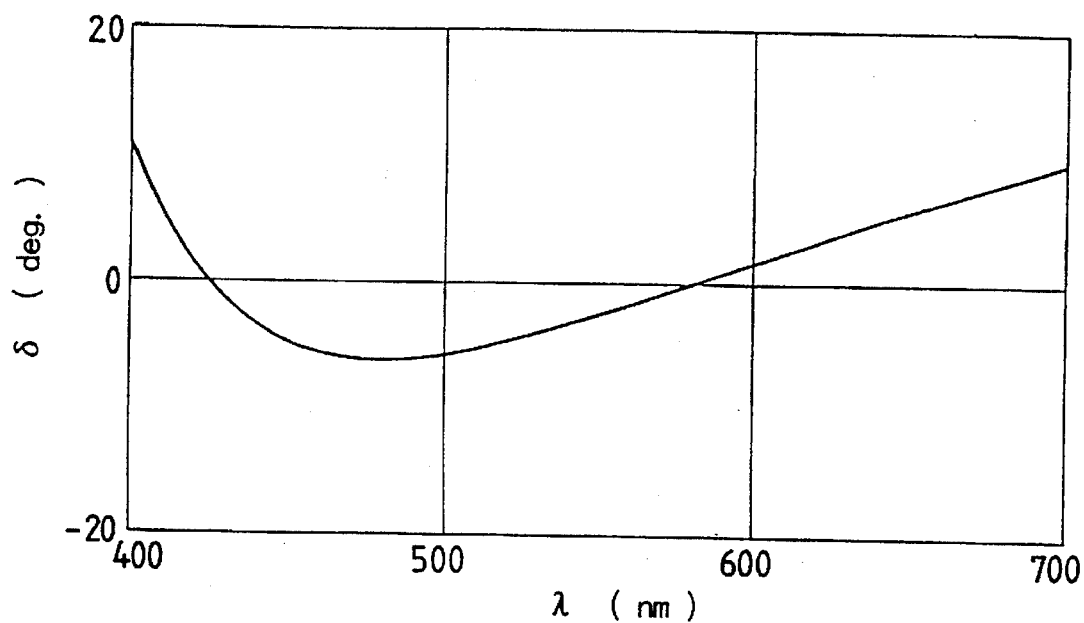
FIG. 20 is a graph illustrating wavelength dependency of phase difference, for light internally reflected at a second surface and third surface of the fifth embodiment of a polarization plane rotator.
Figure 21:
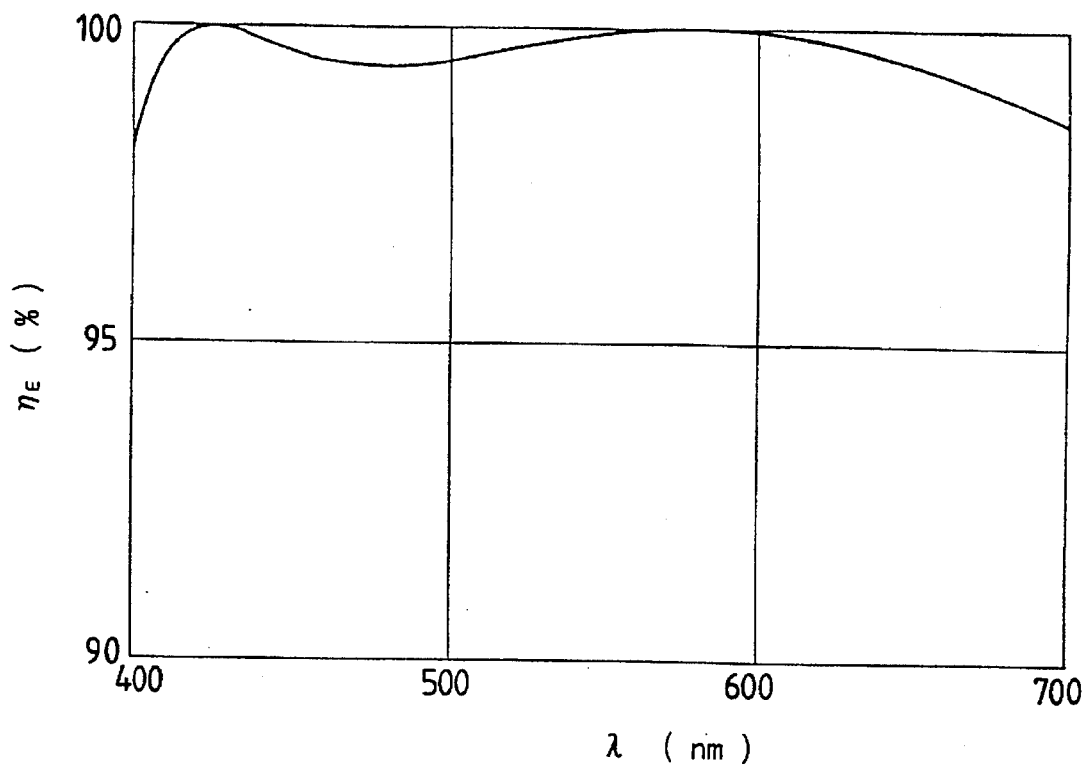
FIG. 21 is a graph illustrating wavelength dependency of a phase difference merit factor, for the fifth embodiment of a polarization plane rotator.

FIG. 19 shows the incident angle dependency of the polarization plane rotation merit factor $\eta_R$ for this embodiment. As shown, that factor $\eta_R$ reaches its maximum value of 1 when the angle of incidence $\theta_1$ is 45°. FIG. 20 shows the wavelength dependency of the internal reflection phase difference δ for the prism surfaces 137, and the wavelength dependency of the phase difference merit factor $\eta_E$ is shown in FIG. 21. Comparing FIGS. 21 and 16, it can be seen that if the refractive index of the prism plate 131 is high, as is the case with the fifth embodiment, then even if the optical thin film formed on the surfaces of the prism elements 135 consists of only two identical layers, the phase difference merit factor $\eta_E$ will be high. In addition, the wavelength dependency of the phase difference merit factor $\eta_E$ is almost a flat characteristic.

TABLE 6

$\theta_1 = 45.0°$

| Item | Material | Refractive Index | Thickness (nm) |
|---|---|---|---|
| Prism | Glass | 1.71 | — |
| First layer | $Y_2O_3$ | 1.78 | 82.2 |
| Second layer | $CeO_2$ | 2.30 | 117.0 |
| Third layer | $MgF_2$ | 1.39 | 105.2 |
| External medium | Air | 1.00 | — |

TABLE 7

$\theta_2 = 49.9°$

| Item | Material | Refractive Index | Thickness (nm) |
|---|---|---|---|
| Prism | Glass | 1.71 | — |
| First layer | $Y_2O_3$ | 1.78 | 124.2 |
| Second layer | $MgF_2$ | 1.39 | 318.9 |
| External medium | Air | 1.00 | — |

Figure 22:
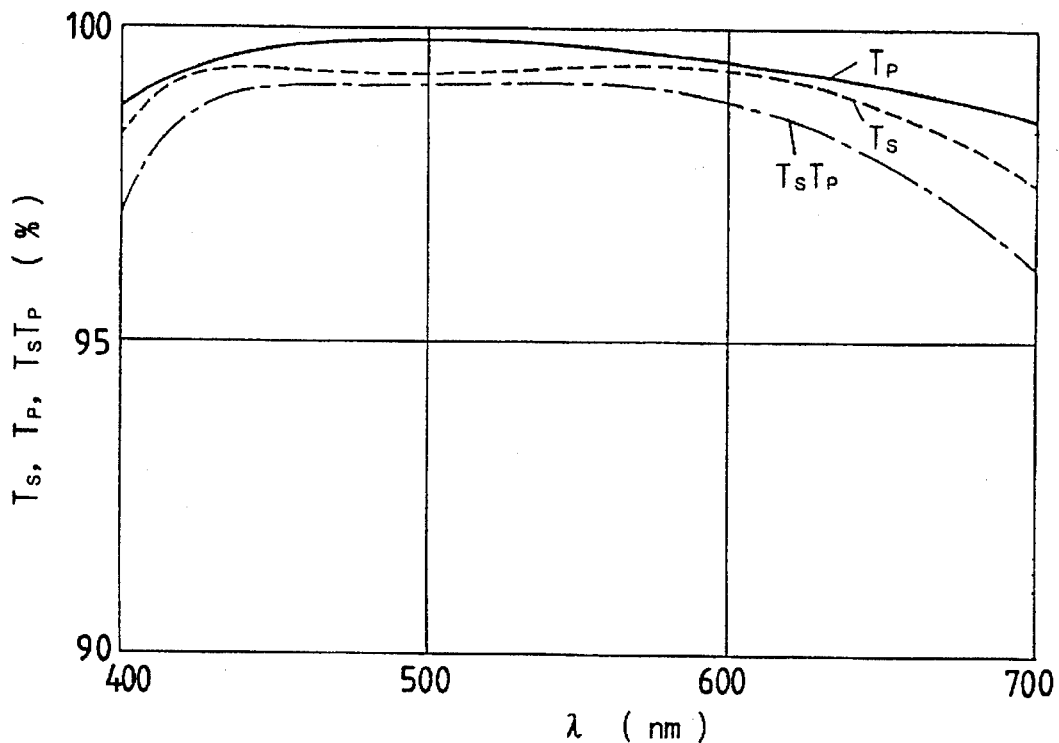
FIG. 22 is a graph illustrating wavelength dependency of transmittance at a surface in that embodiment.

FIG. 22 shows the respective forms of wavelength dependency of the transmittance Ts of the S polarization component, the transmittance Tp of the P polarization component, and the product (Ts Tp) of these transmittances, for the front surface 134 of the prism plate 131 of the fifth embodiment. It can be understood from FIG. 22 that the transmittance of the front surface 134 can made substantially high.

It is possible to utilize a transparent resin as the material constituting the prism plate 131 in the above embodiments, for example acrylic resin, polycarbonate resin, etc., in which case the prism plate 131 can be shaped by compression forming. If the maximum operating temperature of the polarization plane rotator will be no higher than 80° C., then acrylic resin material is suitable. If the prism plate 131 is shaped by a molding process alone, there could be problems with regard to the accuracy of flatness of the surfaces of the prism elements 135. However since the intended applications of such a polarization plane rotator do not include image formation, the requirements for accuracy of the prism elements 135 are not very severe, so that in practice no problems would arise.

It is possible for the plane surface 134 of the prism plate 131 to be joined to another transparent prism. If that is done, then the necessary value of angle between the incident and emitted light can be changed.

Figure 23:
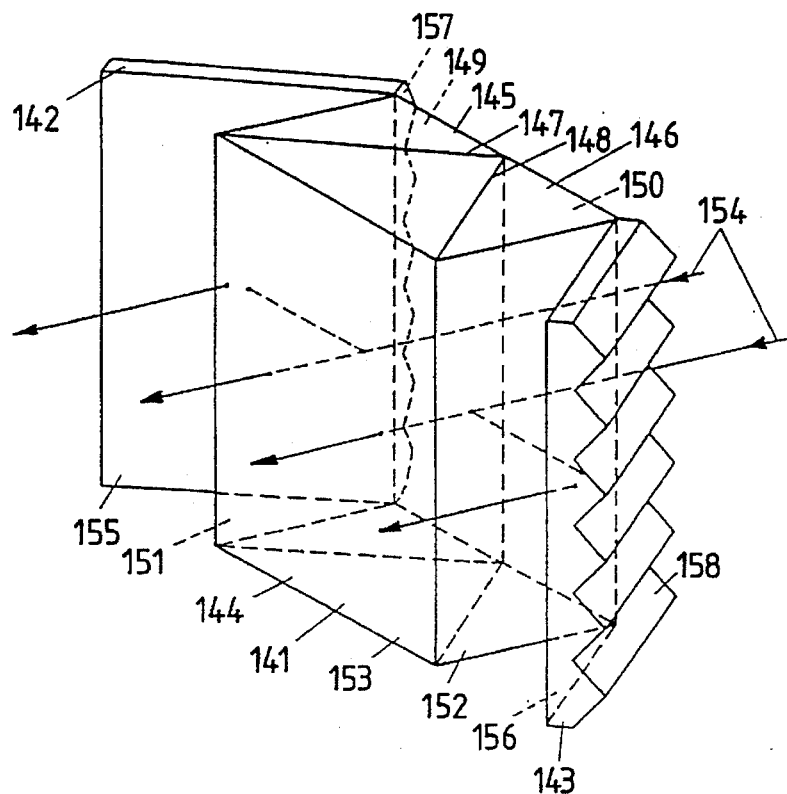
FIG. 23 is an oblique view of a first embodiment of a polarization converter according to the present invention.

A first embodiment of a polarization converter according to the present invention will be described, referring to FIG. 23. This is an oblique view of the embodiment, which consists of a polarizing beam splitter 141 and a pair of polarization plane rotators 142 and 143. The polarizing beam splitter 141 is a combination of three right-angle optical prisms, i.e. a central prism 144 and two outer prisms 145, 146, and two multi-layer optical thin films 147, 148 which are respectively formed by evaporative deposition on respective surfaces of the prism 144, 146. The prisms 144, 145 and 146 are arranged such that the optical thin films 147, 148 are sandwiched between opposing surfaces of the central prism 144 and the outer prisms 145, 146. Each of the prisms 144, 145, 146 is formed of glass, having a refractive index of 1.52.

TABLE 8

$\theta_G = 45.0°$

| Item | Material | Refractive Index | Thickness (nm) |
|---|---|---|---|
| Prism | Glass | 1.52 | — |
| 1st layer | $MgF_2$ | 1.39 | 56.7 |
| 2nd layer | $Y_2O_3$ | 1.78 | 88.5 |
| 3d layer | $MgF_2$ | 1.39 | 113.3 |
| 4th layer | $Y_2O_3$ | 1.78 | 88.5 |
| 5th layer | $MgF_2$ | 1.39 | 113.3 |
| 6th layer | $Y_2O_3$ | 1.78 | 88.5 |
| 7th layer | $MgF_2$ | 1.39 | 113.3 |
| 8th layer | $Y_2O_3$ | 1.78 | 88.5 |
| 9th layer | $MgF_2$ | 1.39 | 113.3 |
| 10th layer | $Y_2O_3$ | 1.78 | 88.5 |
| 11th layer | $MgF_2$ | 1.39 | 113.3 |
| 12th layer | $Y_2O_3$ | 1.78 | 88.5 |
| 13th layer | $MgF_2$ | 1.39 | 113.3 |
| 14th layer | $Y_2O_3$ | 1.78 | 123.9 |
| 15th layer | $MgF_2$ | 1.39 | 158.6 |
| 16th layer | $Y_2O_3$ | 1.78 | 123.9 |
| 17th layer | $MgF_2$ | 1.39 | 158.6 |
| 18th layer | $Y_2O_3$ | 1.78 | 123.9 |
| 19th layer | $MgF_2$ | 1.39 | 158.6 |
| 20th layer | $Y_2O_3$ | 1.78 | 123.9 |
| 21st layer | $MgF_2$ | 1.39 | 158.6 |
| 22nd layer | $Y_2O_3$ | 1.78 | 123.9 |
| 23d layer | $MgF_2$ | 1.39 | 158.6 |
| 24th layer | $Y_2O_3$ | 1.78 | 123.9 |
| 25th layer | $MgF_2$ | 1.39 | 79.3 |
| Prism | Glass | 1.52 | — |

As shown in the Table 8 above, each of the multi-layer optical thin films 147, 148 is formed as a succession of alternating layers of magnesium fluoride (having a refractive index of 1.39) and yttrium trioxide (having a refractive index of 1.78).

Such an optical thin film has the property of transmitting the P polarization component of light which is incident thereon, and reflecting the S polarization component of that light.

The surfaces of the polarizing beam splitter 141 which are exposed to the air, i.e. the surfaces 149, 150, 151, 152 and 153, each have an anti-reflection coating formed thereon by evaporative deposition, consisting of an optical thin film having the configuration shown in the Table 9 below.

TABLE 9

$\theta_I = 0.0°$

| Item | Material | Refractive Index | Thickness (nm) |
|---|---|---|---|
| Prism | Glass | 1.52 | — |
| First layer | $Al_2O_3$ | 1.62 | 78.7 |
| Second layer | $ZrTiO_4$ | 2.10 | 121.4 |
| Third layer | $MgF_2$ | 1.39 | 91.7 |
| External medium | Air | 1.00 | — |

Figure 24:
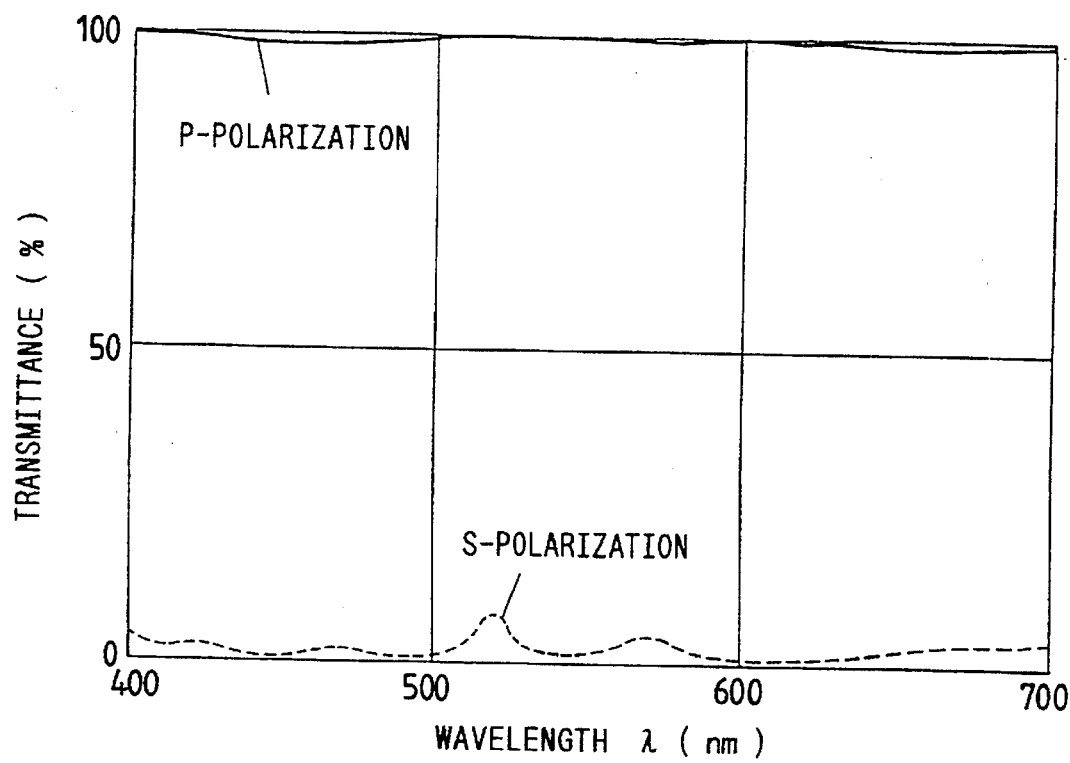
FIG. 24 is a graph showing wavelength dependency of transmittance for the P and S polarization components, for a polarizing beam splitter used in that embodiment.

When natural light 154 is incident perpendicularly on the surfaces 149, 150 of the polarizing beam splitter 141, the S polarization component of that light is reflected sideward by the multi-layer optical thin films 147, 148, to then be emitted through the surfaces 151, 152 of the prisms 145, 146 respectively. The P polarization component of the incident natural light propagates through the multi-layer optical thin films 147, 148 to be emitted from the surface 153 of the central prism 144. FIG. 24 shows the wavelength dependency of the respective transmittances of the S and P polarization components, for the polarizing beam splitter 141. The transmittance for the P polarization component and the reflectance for the S polarization component do not attain respective ideal maximum values of 100%, however as can be understood from FIG. 24, they are close to the maximum values throughout the range of wavelengths shown.

Each of the polarization plane rotators 142, 143 has the same configuration as that shown in FIG. 14. The respective surfaces 155, 156 of these polarization plane rotators which are on the side facing the polarizing beam splitter 141 are flat planes, while the other side of each of the polarization plane rotators 142, 143 is formed with an array of small prism elements 157, 158. The flat surfaces 155, 156 are oriented respectively parallel to the optical thin films 147, 148 of the polarizing beam splitter 141. Light rays which are emitted from the surfaces 151, 152 of the polarizing beam splitter 141 are incident on the flat surfaces 155, 156 of the polarization plane rotators 142, 143 respectively, then after undergoing two successive total reflections within the prisms 157, 158, are emitted through the flat surfaces 155, 156, as illustrated by the arrows in FIG. 23.

When the rays of linearly polarized light which are emitted from the surfaces 151, 152 respectively are incident on the polarization plane rotators 142, 143, the respective planes of polarization of the resultant emitted light rays are rotated through 90°, and the directions of propagation are changed by 90°. Those light rays which are emitted from the polarization plane rotators 142, 143 respectively, and the light rays which are emitted from the surface 153 of the polarizing beam splitter 141, are identical in plane of polarization and identical in direction of propagation. Hence, it can be understood that the polarization converter of FIG. 23 serves to convert natural light into substantially linearly polarized light.

Figure 25:
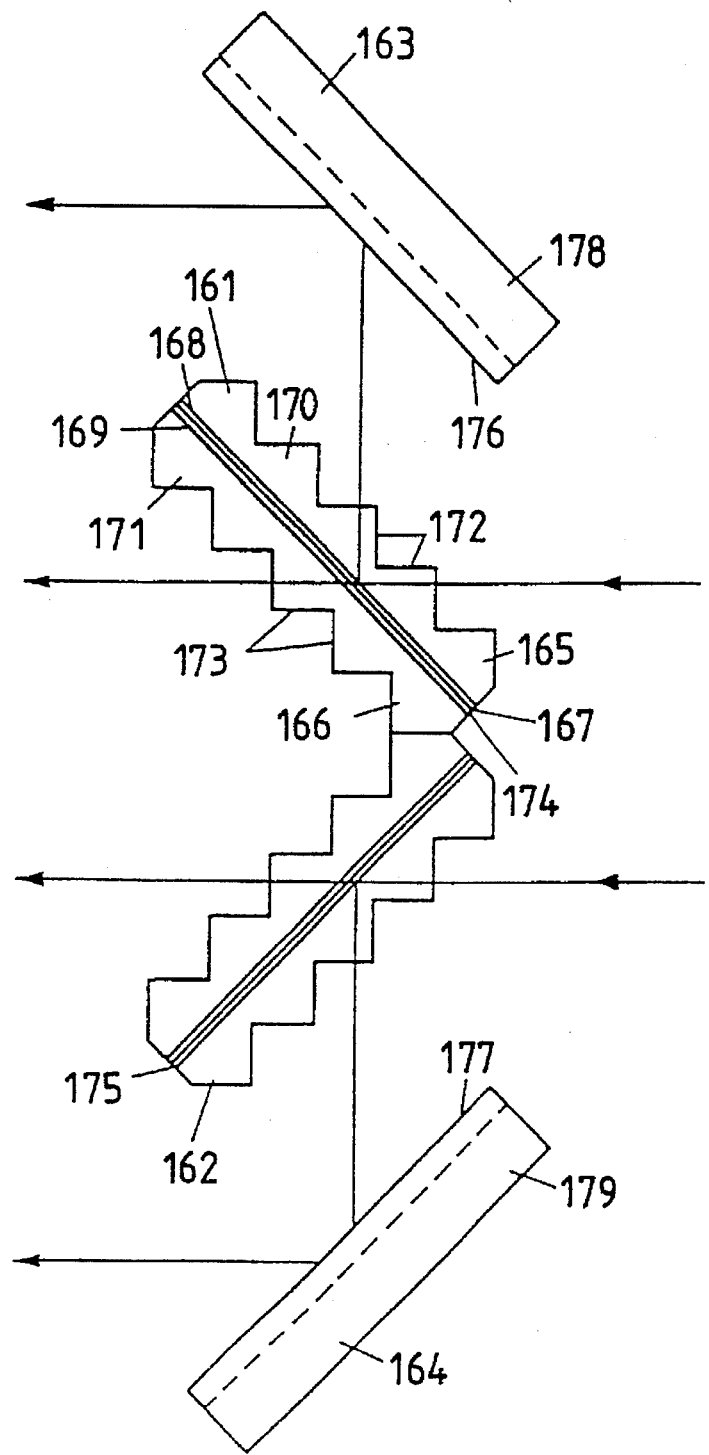
FIG. 25 is a plan view of a second embodiment of a polarization converter according to the present invention.

FIG. 25 is a plan view of a second embodiment of a polarization converter according to the present invention. This embodiment consists of a two polarizing beam splitters 161, 162, and two polarization plane rotators 163, 164. The polarizing beam splitters 161, 162 are mutually identical, and so only the configuration of the polarizing beam splitter 161 will be described. This consists of two transparent plates 165, 166 and a multi-layer optical thin film 167. Each of the transparent plates 165, 166 is formed of glass having a refractive index of 1.71, and has a flat surface 168, 169 on one side thereof and an array of small elongated prism elements 170, 171 formed mutually parallel at regular spacings on the other side thereof. The surfaces 172, 173 of the prism elements 170, 171 respectively are each aligned at an angle of 45° to the corresponding flat surface 168, 169. The prism elements 170, 171 are formed in the transparent plates 165, 166 by molding, as described hereinabove, using a thermally softened glass plate or glass block and a mold having zig-zag internal surface contours. For the reasons described hereinabove, it is not essential for the prism elements 170, 171 to be formed to an extremely high degree of accuracy.

The multi-layer optical thin film 167, which transmits the P polarization component and reflects the S polarization component, is formed on the flat surface 168 of the transparent plate 165, and has the configuration shown in the Table 10 below. Each of the prism elements surfaces 172, 173 has formed thereon an optical thin film functioning as an anti-reflection coating, having the configuration shown in Table 11 below. The two transparent plates 165, 166 are mutually attached by a transparent adhesive material 174, with the flat surfaces 168, 169 mutually adjacent, and with the prism elements 170, 171 aligned mutually parallel.

The other polarizing beam splitter 162 has an identical configuration to the polarizing beam splitter described above.

TABLE 10

$\theta_G = 45.0°$

| Item | Material | Refractive Index | Thickness (nm) |
|---|---|---|---|
| Prism | Glass | 1.71 | — |
| 1st layer | SiO$_2$ | 1.46 | 53.1 |
| 2nd layer | TiO$_2$ | 2.30 | 67.4 |
| 3d layer | SiO$_2$ | 1.46 | 106.2 |
| 4th layer | TiO$_2$ | 2.30 | 67.4 |
| 5th layer | SiO$_2$ | 1.46 | 106.2 |
| 6th layer | TiO$_2$ | 2.30 | 67.4 |
| 7th layer | SiO$_2$ | 1.46 | 106.2 |
| 8th layer | TiO$_2$ | 2.30 | 67.4 |
| 9th layer | SiO$_2$ | 1.46 | 106.2 |
| 10th layer | TiO$_2$ | 2.30 | 94.4 |
| 11th layer | SiO$_2$ | 1.46 | 148.6 |
| 12th layer | TiO$_2$ | 2.30 | 94.4 |
| 13th layer | SiO$_2$ | 1.46 | 148.6 |
| 14th layer | TiO$_2$ | 2.30 | 94.4 |
| 15th layer | SiO$_2$ | 1.46 | 148.6 |
| 16th layer | TiO$_2$ | 2.30 | 94.4 |
| 17th layer | SiO$_2$ | 1.46 | 74.3 |
| Prism | Glass | 1.71 | — |

TABLE 11

$\theta_1 = 0.0°$

| Item | Material | Refractive Index | Thickness (nm) |
|---|---|---|---|
| Prism | Glass | 1.71 | — |
| First layer | Y$_2$O$_3$ | 1.78 | 71.6 |
| Second layer | ZrO$_2$ | 2.00 | 127.5 |
| Third layer | MgF$_2$ | 1.39 | 91.7 |
| External medium | Air | 1.00 | — |

The two polarizing beam splitters 161, 162 are disposed with the multi-layer optical thin films 167, 175 aligned in a V-configuration forming a right angle, as seen in plan, with the apex of that V-shape being pointed in the opposite direction to the propagation direction of a beam of incident natural light.

Figure 26:
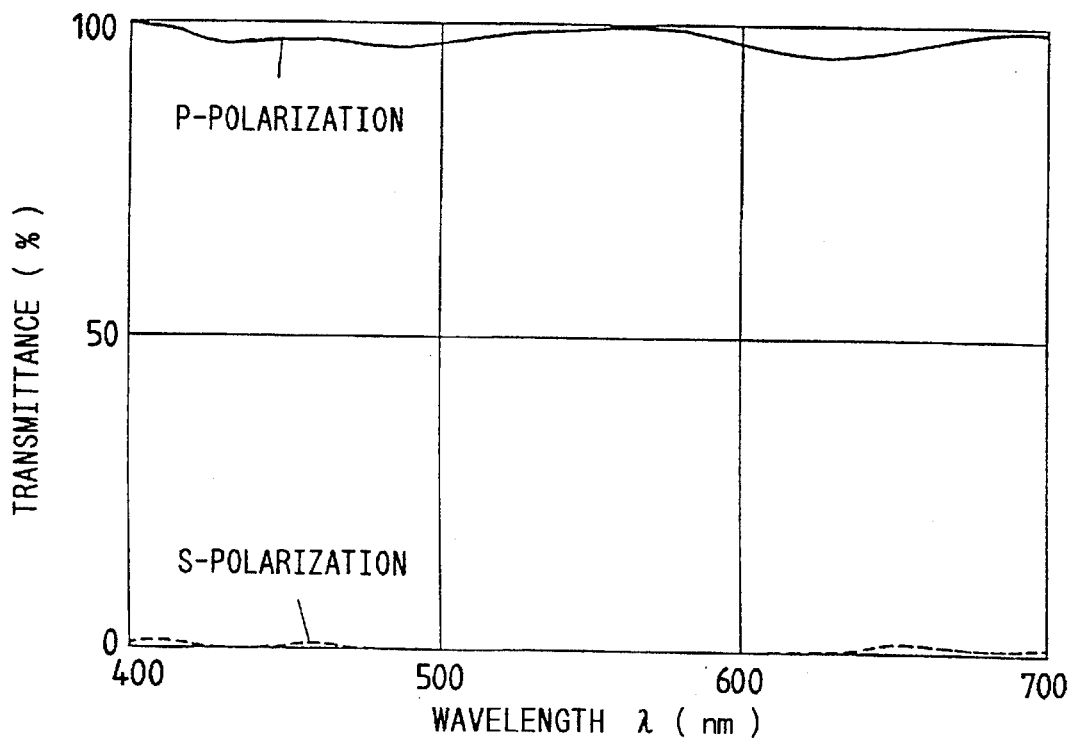
FIG. 26 is a graph showing wavelength dependency of transmittance for the P and S polarization components, for a polarizing beam splitter in FIG. 25.

The P polarization component of that natural light is propagated through each of the polarizing beam splitters 161, 162, while the S polarization component is reflected sideward by the multi-layer optical thin films 167, 175. FIG. 26 shows the wavelength dependency of the respective transmittances for the P and S polarization components, for each of the polarizing beam splitters 161, 162.

Each of the polarization plane rotators 163, 164 has the identical configuration shown in FIG. 12, described hereinabove. Respective flat surfaces 176, 177 of the polarization plane rotators 163, 164 are positioned opposing the polarizing beam splitters 161, 162 respectively, with the respective prism element arrays being designated as 178, 179. The flat surfaces 176, 177 are respectively aligned parallel to the multi-layer optical thin films 167, 175 of the polarizing beam splitters 161, 162 respectively. The S polarization component of the light emitted from the polarizing beam splitters 161 is incident on the flat surface 176 of the polarization plane rotator 163, while the S component from the polarizing beam splitters 162 is incident on the surface 177 of polarization plane rotator 164. In each case, the S component undergoes two total reflections within the prism elements 178, 179, to be then emitted from the flat surfaces 176, 177 of the polarization plane rotators 163, 164.

The linearly polarized light which is propagated through the polarizing beam splitters 161, 162 and emitted therefrom and the linearly polarized light which is emitted from the polarization plane rotators 163, 164 have the respective planes of polarization and directions of propagation mutually parallel. It can thus be understood that this embodiment provides highly efficient conversion of natural light into light which is close to a condition of being completely linearly polarized.

Each multi-layer optical thin film of the polarizing beam splitters 161, 162 is made up of alternating layers of optical thin film having a high refractive index and optical thin film having a low refractive index. It is preferably arranged that the angle of incidence of light at each boundary plane between two of these mutually different layers is the Brewster's angle. That condition is described by S. W. MacNeille in U.S. Pat. No. 2,403,731, and is expressed as follows:

$$\sin\theta_G = \frac{n_H n_L}{n_G \sqrt{n_H^2 + n_L^2}} \quad (29)$$

In the above, $n_H$ is the refractive index of the layers having a high refractive index, and $n_L$ is that of the layers having a low refractive index. $n_G$ is the refractive index of the prism, and $\theta_G$ is the angle of incidence on the multi-layer optical thin film of light which exits from the prism.

From the equation (29), if the effective refractive indexes of the two types of optical thin film are fixed, then the higher the value of $n_G$ the smaller is the value of $\theta_G$. If the polarizing beam splitter has the configuration shown in FIG. 25, then the amount of material necessary to manufacture the polarizing beam splitter will be much smaller than is necessary for the polarizing beam splitter of the embodiment of FIG. 23. Thus, even if an expensive type of glass having a high value of refractive index is used as the material for the polarizing beam splitter of FIG. 25, the material cost can still be relatively low. If the transparent plates of the polarizing beam splitter are thin in shape, then it is possible to use a molding process as described above for forming the prism elements of the polarizing beam splitter, and this further serves to ensure that the overall manufacturing cost of the polarization converter of FIG. 25 can be low.

Figure 27:
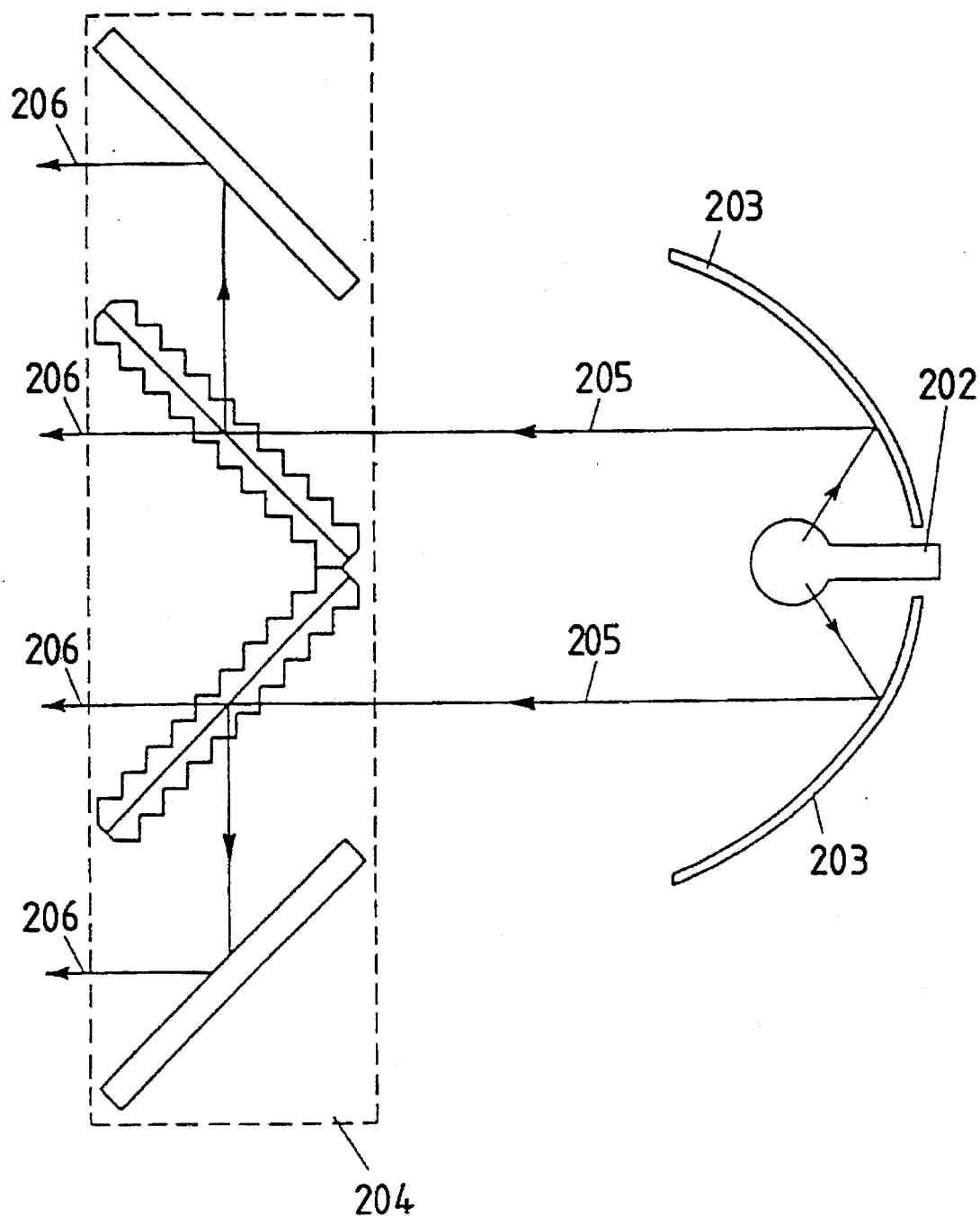
FIG. 27 is a plan view of a first embodiment of a polarized light source according to the present invention.

FIG. 27 is a general cross-sectional view in plan of an embodiment of a polarized light source according to the present invention. Numeral 202 denotes a halogen lamp, and 203 denotes a concave mirror formed of aluminum. Light emitted from the lamp 202 is converted to a directional beam by the concave mirror 203, to be incident on a polarization converter 204. The polarization converter 204 is identical to the polarization converter embodiment shown in FIG. 25. A beam of natural light 205 reflected from the concave mirror 203 is converted to light 206, which is close to being in a linearly polarized condition and is emitted from the polarization converter 204. Such a polarized light source can be effectively used in a light source for various applications. These include illumination applications, for video or still photography. If natural light is used for such illumination, then if the illuminating light falls obliquely on a subject being photographed, some of the light may be strongly reflected from parts of the subject, causing these parts to glitter conspicuously. This problem can be overcome by using linearly polarized light to illuminate the subject. In that case, the direction of the plane of polarization can be adjusted such as to minimize the glitter. This is due to the fact that the reflectance for the S polarization component and P polarization component of the light will vary, over different regions of the subject. Thus by using an polarized light source according to the present invention in such illumination applications, and adjusting the direction of the plane of polarization of the emitted polarized light, the direction of excessive reflection from parts of the subject can be adjusted such that the problem of glitter can be eliminated.

Figure 28:
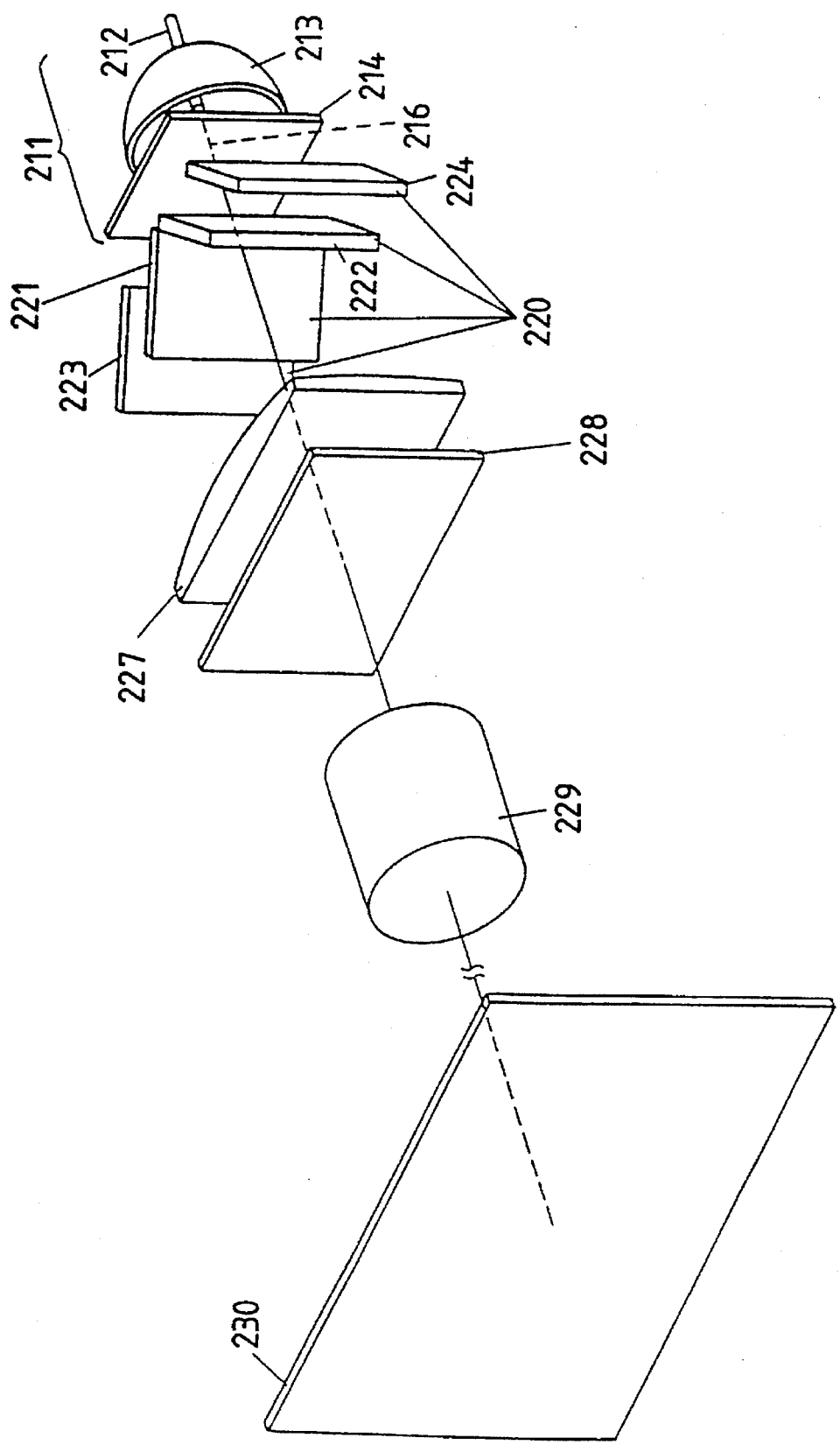
FIG. 28 is an oblique view of a first embodiment of a projection display system according to the present invention.

A first embodiment of a projection display system according to the present invention will be described referring to FIG. 28. A light source 211 consists of a lamp 212, a concave mirror 213, and a filter 214. The lamp 212 is a metal halide lamp which emits natural light containing the three primary colors as color components. The concave mirror 213 is formed of glass having the inner (i.e. reflecting) surface thereof formed in a parabolic shape. A multi-layer optical thin film is formed by evaporative deposition over the inner surface of the concave mirror 213, with the multi-layer optical thin film being configured such as to transmit infra-red radiation and to reflect visible light rays. The filter 214 is a glass plate having a multi-layer optical thin film formed thereon by evaporative deposition. That multi-layer optical thin film is configured to transmit visible light rays and to reflect ultra-violet and infra-red radiation. The optical axis 216 of the concave mirror 213 is aligned horizontally, and the central axis of the lamp 212 (which is of elongated tubular shape) is oriented along the optical axis 216. The light emitted from the lamp 212 is reflected by the concave mirror 213, and converted to a light beam which is closely parallel, with the infra-red radiation components substantially removed, then passes through the filter 214 which removes the ultra-violet radiation component and any remaining infra-red radiation, leaving only visible light to be emitted from the light source 211. That light is then incident on a polarization converter 220. The configuration of the polarization converter 220 is identical to the embodiment of FIG. 25, described hereinabove, being formed of two polarizing beam splitters 221, 222, and two polarization plane rotators 223, 224. Light emitted from the light source 211 is incident on the polarizing beam splitters 221, 222, with the P polarization component being propagated through the polarizing beam splitters 221, 222 and the S polarization component being reflected sideward. The plane of polarization and direction of propagation of the S polarization component are each changed by 90° by the polarization plane rotators 223, 224, such that the light emitted from the polarization plane rotators 223, 224 and the light which is propagated through the polarizing beam splitters 221, 222 have respective polarization planes and directions of propagation that are close to being mutually parallel. It can thus be understood that the polarization converter 220 converts the natural light which is emitted from the light source 211 into light that is close to being in a linearly polarized condition.

The linearly polarized light thus emitted from the polarization converter 220 is transmitted through a field lens 227, to then be incident on a liquid crystal panel 228, which functions as a light valve. The liquid crystal panel 228 of this embodiment is a TFT (thin-film transistor) liquid crystal panel which utilizes TN liquid crystal, and which has built-in color filters. The transmittance of the liquid crystal panel 228 is varied in accordance with a video signal, such as to form a full-color optical image, and the light thus emitted from the liquid crystal panel 228 is transmitted through a projection lens 229, to projected the optical image as an enlarged picture on a projection screen 230 which is spaced at some distance from the projection lens 229.

The liquid crystal panel 228 consists of an incidence side polarizing plate, a liquid crystal panel, and an emission side polarizing plate (not shown in the drawings). The polarization axis of the incidence side polarizing plate is directed in the horizontal direction of the picture. As a result, the transmittance of the incidence side polarizing plate is high, and the optical efficiency of the projection display system is substantially improved by comparison with the prior art. In addition, the amount of light energy that is absorbed by the incidence side polarizing plate is small, thereby ensuring that the incidence side polarizing plate exhibits only a small increase in temperature. Hence, the reliability of that polarizing plate is increased.

Although it has been assumed for simplicity in the descriptions of polarized light source embodiments according to the present invention hereinabove that in each case the polarization plane rotators 223, 224 are oriented such that the reflected light beams from the polarization plane rotators 223, 224 and the propagated light beam from the polarizing beam splitters will all be mutually parallel, in general in a practical apparatus it may be preferable to ensure that the light rays reflected from the polarization plane rotators 223, 224 converge, at a predetermined angle, towards the central axis of the light rays propagated through the polarizing beam splitters 221, 222. That can be accomplished, for example with the embodiment of FIG. 28, by adjusting the respective inclinations of the polarization plane rotators 223, 224 of the polarization converter 220, such as to cause the light emitted from the polarization plane rotator 223 and the light emitted from the polarization plane rotator 224 to converge slightly.

Figure 29A:
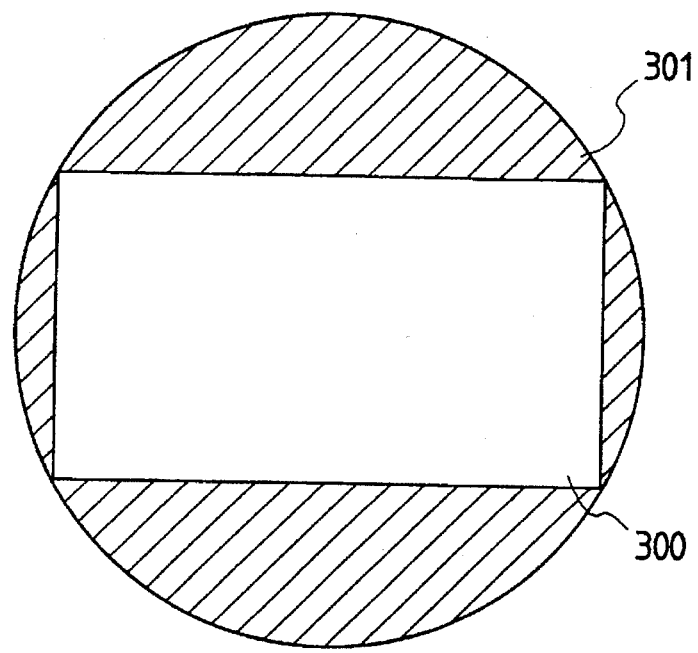
FIGS. 29A, 29B are diagrams illustrating respective light valve illumination patterns formed by a prior art polarized light source and by the polarized light source of the embodiment of FIG. 28.
Figure 29B:
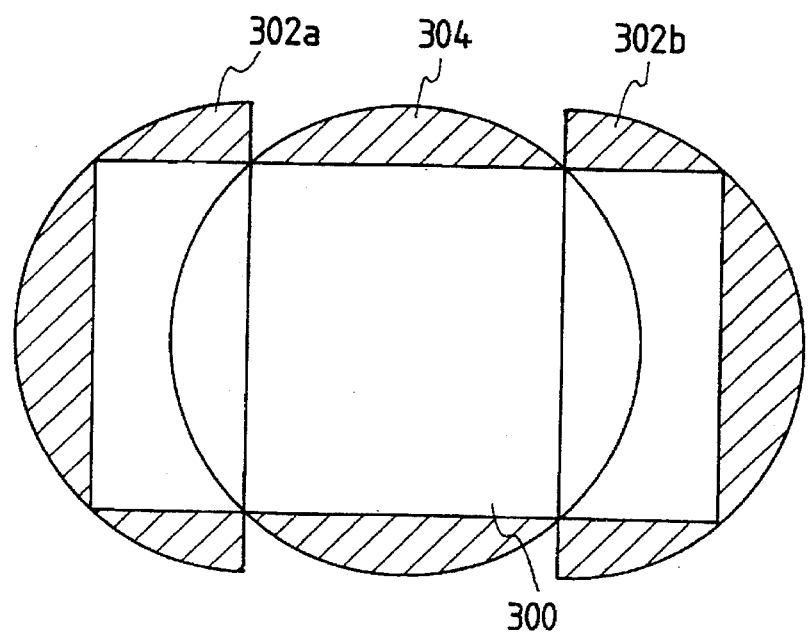

It will be assumed that the liquid crystal panel 228 of this embodiment is configured to provide a display picture having a large value of aspect ratio, for example the ratio 16(horizontal):9(vertical) which is necessary with the Hi-Vision television standard. A polarized light source in accordance with the present invention is particularly advantageous when applied to illuminate a light valve which has a large value of aspect ratio, by comparison with prior art types of polarized light source. The reason for this lies in the fact that the polarized light that is produced is a combination of a central beam (propagated through the polarizing beam splitters 221, 222) and two side beams (reflected from the polarization plane rotators 223,224). With a prior art type of polarized light source, in general the illumination pattern will be identical to the cross-sectional shape of an original light beam, i.e. will be of circular cross-section. Thus, when such a light beam illuminates a light value having a large aspect ratio, as illustrated in FIG. 29A, then a relatively large amount of the light beam cross-sectional area will not be utilized. In FIG. 29A, numeral 300 designates the effective display region of a light valve having a large value of aspect ratio, e.g. 16:9, while the hatched-line region 301 designates the part of the illumination light (from a beam of linearly polarized light having a circular cross-sectional shape) applied to the light valve, which is not utilized. In FIG. 29B, the circular region 304 denotes an area of illumination on the light valve display region 300 that is constituted by light propagated through the polarizing beam splitters 221, 222, while the two semicircular regions 302a, 302b denote the areas of illumination constituted by light reflected from the polarization plane rotators 223, 224, respectively. The polarized light source 220 is configured (as described hereinabove) such that the light beams reflected from the polarization plane rotators 223, 224 will mutually converge, with the amount of convergence at the position of the light valve being determined such as to produce a certain amount of overlap between the light that is provided from the polarization plane rotators 223, 224 and the light that is provided from the polarizing beam splitters 221, 222. It will be clear that, if necessary, various methods could be adopted to ensure that the overall intensity of illumination on the light valve will be substantially uniform, in spite of the regions of illumination overlap.

It can be understood that in this case, the proportion of incident light on the light valve which is effectively used will be substantially greater than in the case of using a prior art type of polarized light source, so that the light utilization efficiency of the projection display system is enhanced. This is a significant advantage of a polarized light source according to the present invention, when used to produce a projected display picture having a large value of aspect ratio.

In some cases, the axis of polarization of the incidence side polarizing plate of the light valve may be aligned at an angle of 45° to the vertical direction of the display picture. In such a case, a polarizing light source according to the present invention can be utilized if a half-wave plate is disposed at the incidence side of the incidence side polarizing plate, with the direction of a fast axis (a phase advance axis) or a slow axis (a phase retardation axis) of the half-wave plate being inclined at an angle of 22.5° relative to the vertical direction of the display picture, to thereby maximize the amount of light which will be transmitted through the incidence side polarizing plate.

Figure 30:
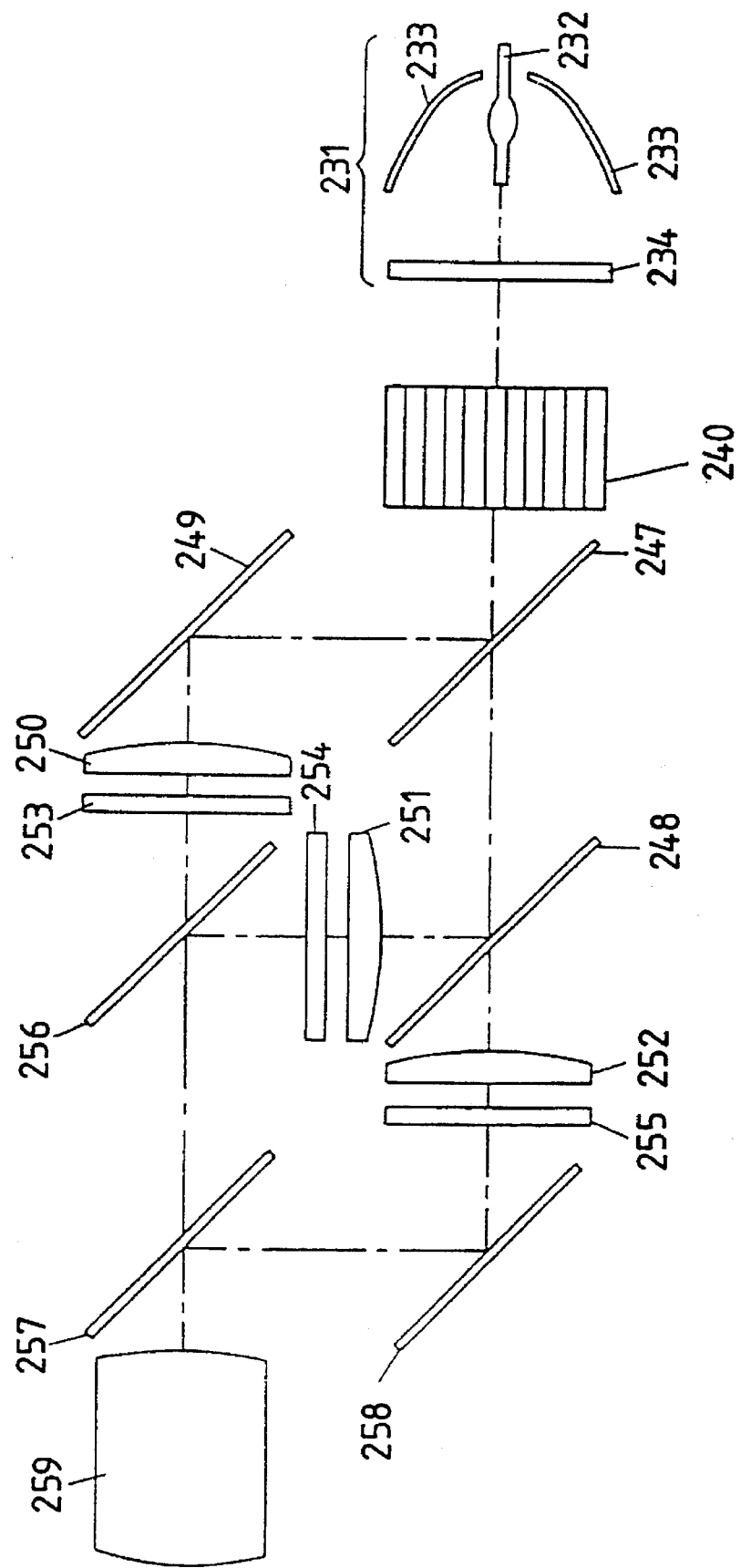
FIG. 30 is a conceptual cross-sectional view in elevation of a second embodiment of a projection display system according to the present invention.

FIG. 30 is a general cross-sectional view in elevation of a second embodiment of a projection display system according to the present invention. The light source 231 is configured identically to the light source 211 of the embodiment of FIG. 28 described above, consisting of a lamp 232, a concave mirror 233 and a filter plate 234. Natural light emitted from the lamp 232 is converted by the concave mirror 233 to a substantially parallel beam, with the infra-red rays removed, and the ultra-violet rays and remaining infra-red rays are removed by the filter 234, which transmits only visible natural light rays. The light from the filter 234 falls on a polarization converter 240, which has the same configuration as that shown in FIG. 25 and described hereinabove. The natural light transmitted through the filter 234 is thereby converted to light which is substantially close to being in a linearly polarized condition, with the polarizing plane being vertical to the plane of the paper, as viewed in FIG. 30. The linearly polarized light from the polarization converter 240 is incident on polarization selective mirrors 247, 248 and on a plane mirror 249, which constitute a color separating optical system for separating the red, green and blue primary color components of the light. These primary color components then pass through respective field lenses 250, 251 and 252, and are then incident on respective liquid crystal panels 253, 254 and 255. Each of the liquid crystal panels 253 to 255 is a TFT liquid crystal panel, utilizing TN liquid crystal, and changes in transmittance in accordance with a video signal, to form an optical image. The resultant light emitted from the liquid crystal panels 253, 254, 255 is combined into a single light beam by a color combining optical system which is a combination of polarization selective mirrors 256, 257 and a plane mirror 258. The combined light is then incident on a projection lens 259, to be projected onto a projection screen (not shown in the drawing) that is spaced at a distance from the projection lens 259, to form an enlarged display picture.

Each of the liquid crystal panels 253, 254, 255 is formed of an incidence side polarizing plate, a liquid crystal panel, and an emission side polarizing plate. The polarization axis of the incidence side polarizing plate is directed in the horizontal direction of the picture (which is perpendicular to the paper plane, as seen in FIG. 30). As a result, the transmission coefficient of the incidence side polarizing plate is high, and the optical efficiency of the projection display system is high. In addition, the amount of light energy that is absorbed by the incidence side polarizing plate is small, thereby ensuring that the incidence side polarizing plate only has a small increase in temperature, so that the reliability of that polarizing plate is increased.

In addition, for the same reasons as have been described hereinabove for the first embodiment of a projection display system according to the present invention, the second projection display system embodiment is highly advantageous when configured to produce a display picture having a large value of aspect ratio, such as 16:9, since the proportion of the polarized light which is effectively incident on the display regions of each of the liquid crystal panels 253, 254, 255 is substantially increased, by comparison with a projection display system utilizing a prior art type of polarized light source.

With the projection display system of FIG. 30, the polarization converter 240 is positioned between the light source 231 and the color analyzing optical system. However it would be equally possible to position polarization converters between dichroic mirrors of the color analyzing optical system and between a dichroic mirror and a flat mirror. In that case it would be necessary to use two polarization converters. However since the temperature at which each of these polarization converters must operate would be substantially lower than is required for the polarization converter 240 in FIG. 30, it would be possible to form the polarization converters from an inexpensive material having a relatively low resistance to heat.

In the above description of projection display system embodiments, it has been assumed that in each case a light valve is used which is a TFT liquid crystal panel, utilizing TN liquid crystal. However it would also be possible to use other types of light valve, for example liquid crystal panels using other types of liquid crystal, or devices using a material such as electro-optical crystal whereby an optical image is formed by changes in the double refraction characteristic. In general, a polarization converter according to the present invention is applicable to any type of projection display system which utilizes a light valve having at least an incidence side polarizing plate.

From the above description of embodiments, it can be understood that the present invention provides a polarization plane rotator which can be compact in size and can be configured to exhibit only a small degree of dependency of its characteristics upon wavelength. The invention further provides a polarization converter whereby natural light is efficiently converted to light which is substantially close to being in a linearly polarized condition. Moreover by using such a polarization converter, a polarized light source can be provided which has a high degree of light utilization efficiency, and as a result, a projection display system can be provided which has a high degree of light utilization efficiency.

Although the present invention has been described in the above with reference to specific embodiments which are shown in the appended drawings, and to specific configurations for optical films used in these embodiments as set out in the appended tables, it should be understood that various modifications to these embodiments could be envisaged, which fall within the scope claimed for the invention.

What is claimed is:

1. A polarization plane rotator comprising:
   a transparent prism having a cross-sectional shape in the form of an isosceles triangle, having a first plane surface, a second plane surface, a third plane surface, an optical thin film formed on each of said second plane surface and said third plane surface, an incident light axis along which an incident light ray propagates, and an emitted light axis along which propagates an emitted light ray corresponding to said incident light ray;
   wherein said optical thin film has a refractive index that is lower than a refractive index of said prism,
   wherein each of said incident light axis and emitted light axis is oriented substantially parallel to a reference plane of said rotator and obliquely intersects said first plane surface,
   said reference plane being defined as a plane which includes a line of intersection of said second and third plane surfaces and intersects said prism symmetrically, wherein said rotator is disposed within air, and wherein:
   said incident light ray which has an entry plane of polarization and propagates along said incident light axis is refracted at said first plane surface to fall on either of said second plane surface and said third plane surface to be reflected thereby;
   a light ray refracted at said first plane surface and reflected at said second plane surface is reflected at said third plane surface, and a light ray refracted at said first plane surface and reflected at said third plane surface is reflected at said second plane surface; and
   light rays which have been successively reflected at both said second and third plane surfaces are then refracted at said first plane surface, to exit from said prism along said emitted light axis with a plane of polarization of exit light rays rotated relative to said plane of polarization of said incident light ray.

2. A polarization plane rotator according to claim 1, wherein said second and third plane surfaces are mutually identical in size and shape.

3. A polarization plane rotator according to claim 1, wherein an angle of intersection between said second and third plane surfaces is a right angle.

4. A polarization plane rotator according to claim 1, wherein the reflection of light at said second plane surface and the reflection of light at said third surface are respective total reflections.

5. A polarization plane rotator according to claim 1, wherein said optical thin film comprises a multi-layer optical thin film having at least two layers, formed on each of said second plane surface and said third plane surface and wherein, designating a refractive index of said transparent prism as $n_o$, successive layers of said multi-layer optical thin film extending sequentially from said transparent prism as a first layer to a k-th layer respectively, a refractive index of a j-th one of said layers as $n_j$ and a thickness of said $j_{th}$ layer as $d_j$, an angle of refraction in said j-th layer as $\gamma_j$, and a principal wavelength of said incident light in air as $\lambda_c$, the following conditions are satisfied:

$$\sqrt{n_0} = \begin{cases} \dfrac{n_1 n_3 \ldots n_k}{n_2 n_4 \ldots n_{k-1}} & (k: odd) \\ \dfrac{n_1 n_3 \ldots n_{k-1}}{n_2 n_4 \ldots n_k} & (k: even) \end{cases}$$

$$d_j = \dfrac{\lambda_c}{4 n_j \cos\gamma_j} .$$

6. A polarization plane rotator according to claim 5, wherein said value k is equal to 2.

7. A polarization plane rotator according to claim 5, wherein said refractive index of said k-th layer is lower than said refractive index of said transparent prism.

8. A polarization plane rotator according to claim 5, wherein said k-th layer is formed of magnesium fluoride.

9. A polarization plane rotator according to claim 1, wherein said optical thin film comprises a basic multi-layer optical thin film having at least two layers, formed on each of said second plane surface and said third plane surface and wherein, designating a refractive index of said transparent prism as $n_o$, successive layers of said basic multi-layer optical thin film extending sequentially from said transparent prism as a first layer to a k-th layer respectively, a refractive index of a j-th one of said layers as $n_j$ and a thickness of said j-th layer as $d_j$, an angle of refraction in said j-th layer as $\gamma_j$, and a principal wavelength of said incident light in air as $\lambda_c$, the following conditions are satisfied:

$$\sqrt{n_0} = \begin{cases} \dfrac{n_1 n_3 \ldots n_k}{n_2 n_4 \ldots n_{k-1}} & (k: odd) \\ \dfrac{n_1 n_3 \ldots n_{k-1}}{n_2 n_4 \ldots n_k} & (k: even) \end{cases}$$

$$d_j = \dfrac{\lambda_c}{4 n_j \cos\gamma_j}$$

and further comprising an optical thin film having a refractive index $n_j'$, thickness $d_j'$ and angle of refraction of $\gamma_j'$, said optical thin film being formed between a j'-th layer and a (j'-1)-th layer of said basic multi-layer optical thin film, where j' is an arbitrary integer which is greater than 1 and the following condition is satisfied:

$$d_j' = \dfrac{\lambda_c}{2 n_j' \cos\gamma_j'}.$$

10. A polarization plane rotator according to claim 9, wherein k is equal to 2.

11. A polarization plane rotator according to claim 9, wherein said refractive index of said k-th layer is lower than said refractive index of said transparent prism.

12. A polarization plane rotator according to claim 9, wherein said k-th layer is formed of magnesium fluoride.

* * * * *